United States Patent
Ayres et al.

(10) Patent No.: US 11,446,718 B2
(45) Date of Patent: Sep. 20, 2022

(54) SYSTEMS AND METHODS FOR AUTOMATICALLY CLEANING WHEELS

(71) Applicant: TOYOTA MOTOR NORTH AMERICA, INC., Plano, TX (US)

(72) Inventors: Julie Ayres, Carrollton, TX (US); Dario Jose Villarreal Suarez, Farmers Branch, TX (US)

(73) Assignee: TOYOTA MOTOR NORTH AMERICA, INC., Plano, TX (US)

( * ) Notice: Subject to any disclaimer, the term of this patent is extended or adjusted under 35 U.S.C. 154(b) by 0 days.

(21) Appl. No.: 16/908,290

(22) Filed: Jun. 22, 2020

(65) Prior Publication Data

US 2021/0394240 A1  Dec. 23, 2021

(51) Int. Cl.

| | | |
|---|---|---|
| *B08B 13/00* | (2006.01) | |
| *B08B 1/00* | (2006.01) | |
| *B08B 3/08* | (2006.01) | |
| *A61G 5/10* | (2006.01) | |
| *B08B 5/02* | (2006.01) | |
| *B08B 7/04* | (2006.01) | |
| *B08B 7/00* | (2006.01) | |
| *B08B 7/02* | (2006.01) | |

(52) U.S. Cl.
CPC ............... *B08B 13/00* (2013.01); *A61G 5/10* (2013.01); *B08B 1/002* (2013.01); *B08B 3/08* (2013.01); *B08B 5/02* (2013.01); *B08B 7/0071* (2013.01); *B08B 7/02* (2013.01); *B08B 7/04* (2013.01)

(58) Field of Classification Search
None
See application file for complete search history.

(56) References Cited

U.S. PATENT DOCUMENTS

| | | | | |
|---|---|---|---|---|
| 4,930,176 | A | * | 6/1990 | Gelman ............... A47L 1/05 15/105 |
| 6,633,150 | B1 | * | 10/2003 | Wallach .............. B25J 5/007 318/568.12 |
| 9,067,570 | B2 | | 6/2015 | Kueppers |
| 9,346,438 | B1 | | 5/2016 | Parker, III |
| 9,718,446 | B1 | | 8/2017 | Tolbert |
| 9,994,198 | B1 | | 6/2018 | Emanuelli |
| 10,196,048 | B2 | | 2/2019 | Yoon et al. |
| 2008/0258451 | A1 | | 10/2008 | Thygesen |
| 2016/0339879 | A1 | * | 11/2016 | Hirata ................. B60S 3/042 |

FOREIGN PATENT DOCUMENTS

CN          107184327 A       9/2017

* cited by examiner

*Primary Examiner* — Eric W Golightly
(74) *Attorney, Agent, or Firm* — Dinsmore & Shohl LLP

(57) ABSTRACT

The systems and methods of automatically cleaning a wheel are disclosed herein. The systems and methods include a foreign matter detector arranged adjacent to the wheel, a cleaning device arranged adjacent to the wheel, one or more processors communicatively coupled to the foreign matter detector and the cleaning device; and a non-transitory, processor-readable storage medium communicatively coupled to the one or more processors. The non-transitory, processor-readable storage medium includes one or more programming instructions stored thereon that, when executed, cause the one or more processors to: receive a signal from the foreign matter detector, the signal being indicative of possible foreign matter present on a surface of the wheel, determine from the signal, whether foreign matter is present on the wheel, and direct the cleaning device to remove the foreign matter from the wheel.

20 Claims, 10 Drawing Sheets

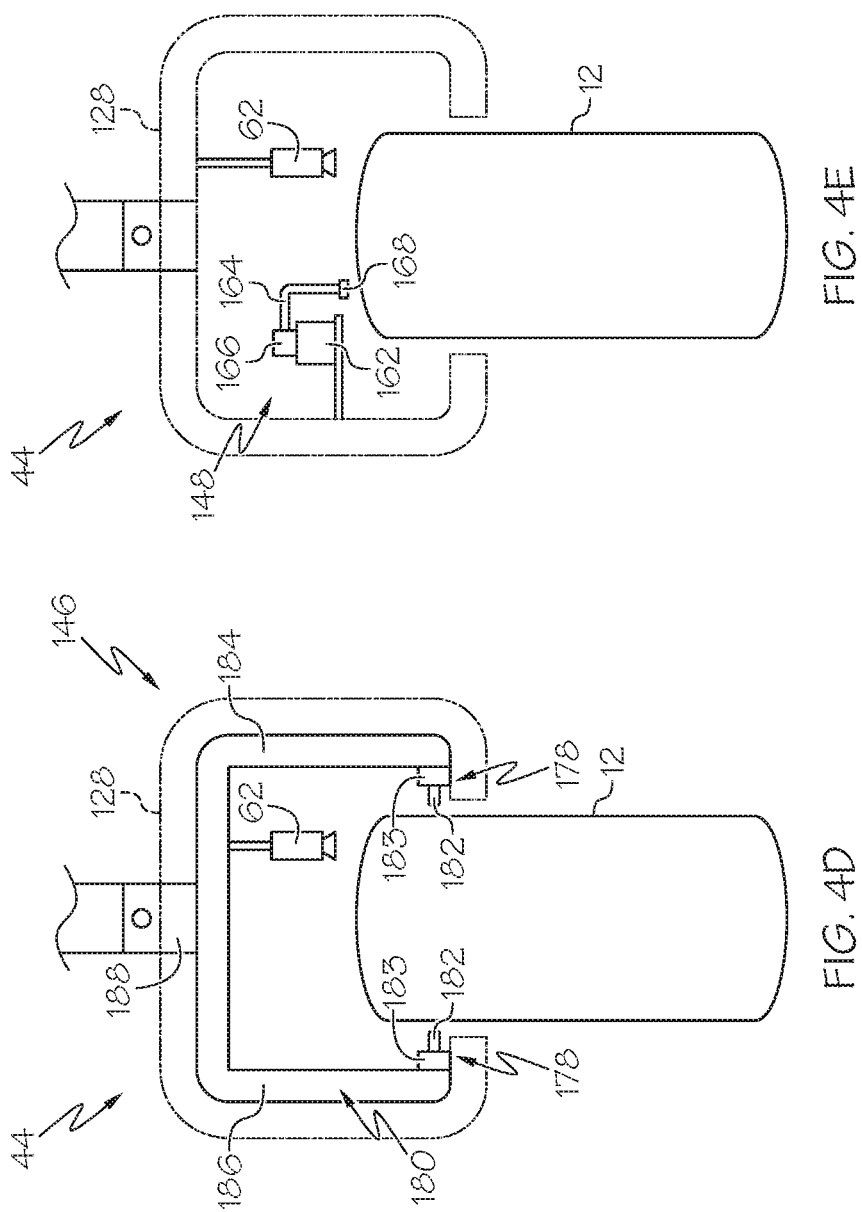

SYSTEMS AND METHODS FOR AUTOMATICALLY CLEANING WHEELS

TECHNICAL FIELD

The present disclosure generally relates to self-cleaning wheels, and more specifically, to systems and methods for automatically cleaning one or more wheels attached to a mobile utility machine.

BACKGROUND

In general, a mobile utility machine, such as wheelchair, a robot, or the like, travels between indoor and outdoor environments. Occasionally, the mobile utility machine may accumulate foreign matter on the one or more wheels, such as dirt, mud, snow, debris, or the like when in the outdoor environment. A user of the mobile utility machine may find it difficult, cumbersome, and time consuming to determine whether foreign matter is present on the wheels and/or to clean the wheels when foreign matter is present on the wheels. Likewise, a user may find difficult to clean the wheels of the mobile utility machine when moving from the outdoor environment to the indoor environment along with finding it difficult, cumbersome, and time consuming to wipe off the foreign matter on the wheels prior to traveling from the outdoor environment to the indoor environment. As a result, the mobile utility machine may have soiled wheels when crossing a threshold, such as into a house, an office, or some other building.

SUMMARY

In one aspect of the present disclosure, a system of automatically cleaning a wheel includes a foreign matter detector arranged adjacent to the wheel, a cleaning device arranged adjacent to the wheel, one or more processors communicatively coupled to the foreign matter detector and the cleaning device; and a non-transitory, processor-readable storage medium communicatively coupled to the one or more processors. The non-transitory, processor-readable storage medium includes one or more programming instructions stored thereon that, when executed, cause the one or more processors to: receive a signal from the foreign matter detector, the signal being indicative of possible foreign matter present on a surface of the wheel, determine from the signal, whether foreign matter is present on the wheel, and direct the cleaning device to remove the foreign matter from the wheel.

In another aspect of the present disclosure, a method of automatically cleaning a wheel includes receiving a signal, by one or more processing devices, the signal being indicative of possible foreign matter present of a surface of the wheel, determining, by the one or more processing devices, from the signal whether the foreign matter is present on the wheel, and directing, by the one or more processing devices, a cleaning device to remove the foreign matter from the wheel when the foreign matter is present on the wheel.

In still another aspect of the present disclosure, a system for automatically cleaning one or more wheels includes a mobile utility machine having one or more wheels, a foreign matter detector positioned adjacent to the one or more wheels to sense an amount of foreign matter on the one or more wheels, a cleaning device positioned adjacent to the one or more wheels to clean the wheel, and a cleaning determination module communicatively coupled to the foreign matter detector and configured to receive a signal from the foreign matter detector such that the signal being indicative of possible foreign matter present of a surface of the wheel, determine from the signal whether the foreign matter is present on the wheel, and direct the cleaning device to remove the foreign matter from the one or more wheels when the foreign matter is present on the one or more wheels.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 4D schematically depicts yet another illustrative cleaning device including a vibration mechanism and a foreign matter detector according to one or more embodiments disclosed and shown herein;

FIG. 4E schematically depicts still another illustrative cleaning devices including a solvent applicator and a foreign matter detector according to one or more embodiments disclosed and shown herein;

DETAILED DESCRIPTION

The embodiments of the present disclosure generally relate to systems and methods for automatically cleaning a wheel, particularly a wheel of devices or systems that cross from an outdoor environment to an indoor environment where there is a risk of the wheel tracking debris from the outdoor environment into the indoor environment (e.g., mobile robots, wheelchairs, or the like). In some embodiments, the systems and methods include a wheel, a foreign matter detector, a cleaning device, and a cleaning determination module. The foreign matter detector is positioned adjacent to the wheel to sense an amount of foreign matter on the wheel. The cleaning device is positioned adjacent to the wheel to clean the wheel. The cleaning determination module is communicatively coupled to the foreign matter detector. In some embodiments, the cleaning determination module receives a signal, from the foreign matter detector, the signal being indicative of possible foreign matter present on a surface of the wheel, determines from the signal whether the foreign matter is present on the wheel and directs the cleaning device to remove the foreign matter from the wheel when the foreign matter is present on the wheel. In response, the cleaning device automatically cleans and/or removes the foreign matter from the wheel.

Figure 1A:
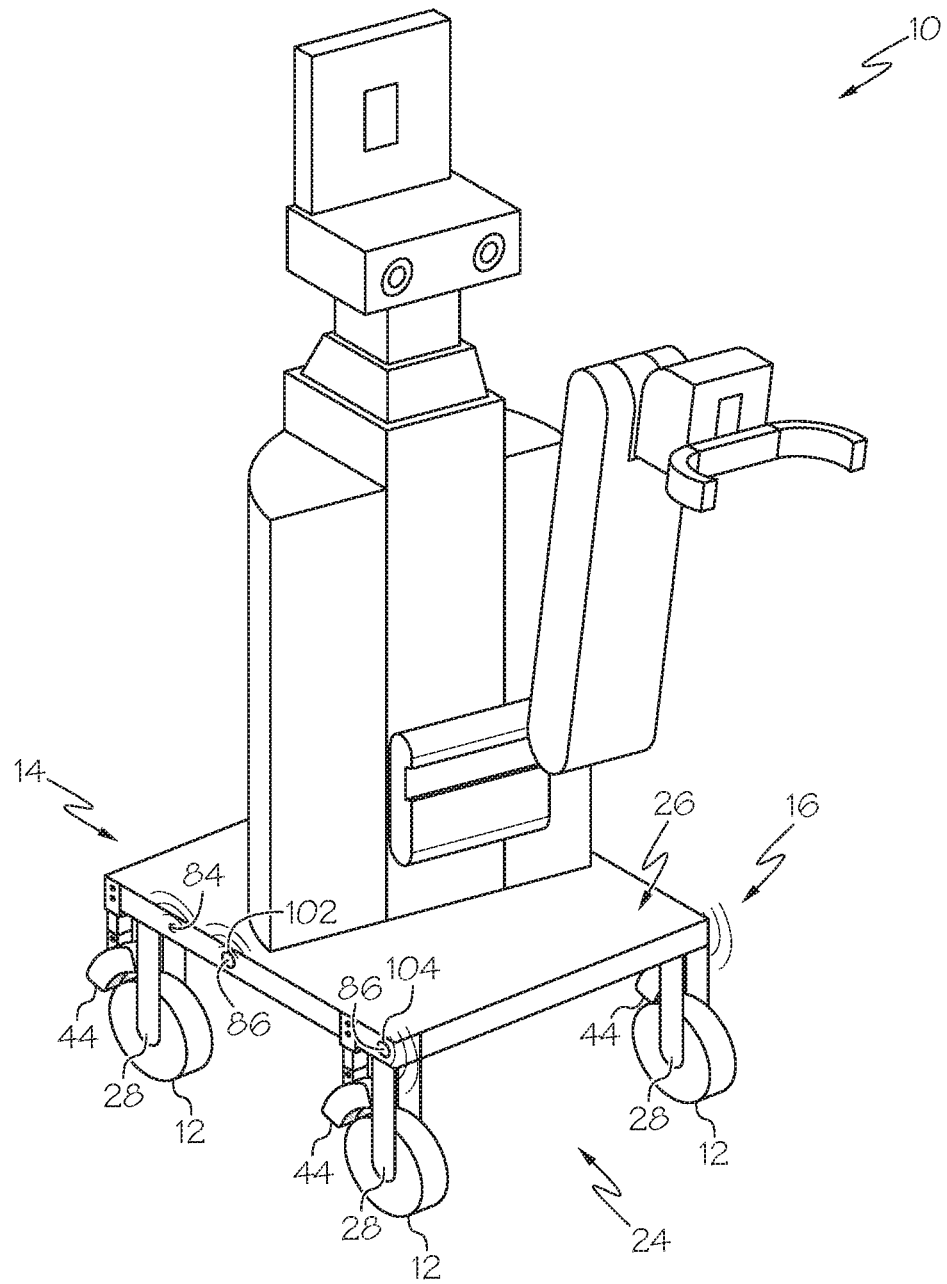
FIG. 1A schematically depicts an illustrative automatic system for cleaning one or more wheels of a mobile robot according to one or more of the embodiments disclosed herein.
Figure 1B:
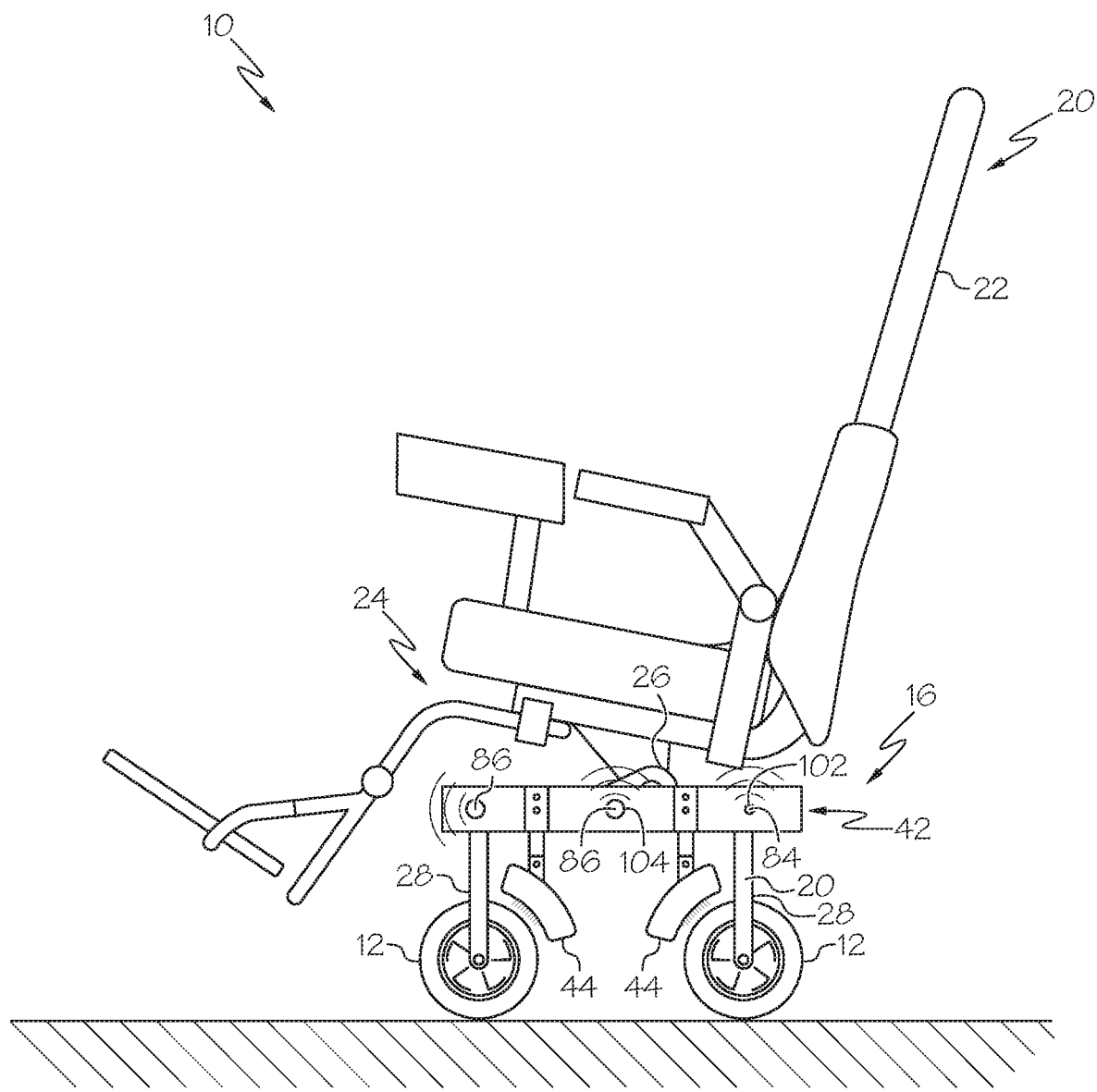
FIG. 1B schematically depicts an illustrative automatic system for cleaning one or more wheels of a wheelchair according to one or more of the embodiments disclosed and shown herein.

Referring to FIGS. 1A and 1B, an example system 10 for automatically cleaning one or more wheels 12 will now be discussed. The system 10 may include a mobile utility machine (e.g., a mobile robot 14 as depicted in FIG. 1A or a wheelchair 20 as depicted in FIG. 1B). Still referring to FIGS. 1A and 1B, the mobile utility machine includes the one or more wheels 12 and a wheel cleaning system 16 being coupled to the mobile utility machine to clean the one or more wheels 12. Various embodiments of the system 10 and the operation of the system 10 will be described in more detail below.

Still referring to FIGS. 1A-1B, an example mobile utility machine of the system 10 will now be discussed. As disclosed herein, a mobile utility machine may generally be defined as any device, component, machine, or system that is configured to transport one or more persons or goods, mimic one or more human functions, and/or the like. In some embodiments, the mobile utility machine may include, for example, but is not limited to, a mobile robot 14 (FIG. 1A) or a wheelchair 20 (FIG. 1B). Other non-limiting examples (not shown) of the mobile utility machine may include, but are not limited to, a vehicle, an airplane, a toy, or the like. For the purposes of compact explanation, the term "mobile utility machine" will be used herein as a term that encompasses the mobile robot 14 (FIG. 1A), the wheelchair (FIG. 1B), and/or any other vehicle, airplane, toy, or the like.

As shown in FIG. 1A, in some embodiments, the mobile utility machine may include the mobile robot 14. The mobile robot 14 may include the one or more wheels 12. The mobile robot 14 is generally any machine able to traverse across a floor or ground from point A to point B. In some embodiments, the mobile robot 14 may be configured for one or more tasks, such as object transportation, lawn mowing, vacuum cleaning, floor sweeping, snow removal, and/or the like. In some embodiments, the mobile robot 14 may be configured to aid in the transportation or movement of humans, such as patients within or outside of a hospital, clinic, retirement home, or the like. In some embodiments, the mobile robot 14 may generally include processors, control hardware, software, and combinations thereof for controlling the requisite operations of the mobile robot 14. In one or more embodiments, the mobile robot 14 may also include a power source (not shown), such as a battery, that can be recharged using a charging system (not shown). Various other components of the mobile robot 14 not specifically described herein should generally be understood.

Referring to FIG. 1B, in some embodiments, the mobile utility machine may include the wheelchair 20, such as a power wheelchair. In some embodiments, the wheelchair 20 may be a manual wheelchair. In other embodiments, the wheelchair 20 may be a power wheelchair. The wheelchair 20 may include an upper component 22 and a power base 24. In one or more embodiments, the upper component 22 may be a chair configured to support a user of the wheelchair 20. In embodiments, the chair may be a customized chair for the user. In some embodiments, the upper component 22 may be a component configured to support an object, for example, a tray for carrying food, a bin for carrying parcels, etc. In some embodiments, the wheelchair 20 may generally include processors, control hardware, software, and combinations thereof for controlling the requisite operations of the wheelchair 20. In one or more embodiments, the wheelchair 20 may also include a power source (not shown), such as a battery, that can be recharged using a charging system (not shown). Various other components of the wheelchair 20 not specifically described herein should generally be understood.

Referring again to FIGS. 1A-1B, the mobile utility machine may include a power base 24 in some embodiments. The power base 24 may include a base frame 26 having one or more caster fork assemblies 28 and the one or more wheels 12. In one or more embodiments, the one or more wheels 12 may include, for example, one or more guide wheels and/or one or more drive/main wheels. In some embodiments, the one or more wheels 12 may be coupled to base frame 26 via the one or more caster fork assemblies 28. In one or more embodiments, the one or more wheels 12 may be coupled or attached to a gearbox of the frame and coupled to the base frame 26 via the one or more caster fork assemblies 28. Various components of the system 10 may be located and positioned within and housed by the power base 24.

In some embodiments, the one or more wheels 12 may include one or more guide wheels and/or one or more drive wheels. In some embodiments, the one or more wheels 12 may be configured to allow the mobile utility machine to traverse or travel across a ground or floor from one point to another point. In one or more embodiments, the one or more wheels 12 may be of the same size and/or function as shown in FIGS. 1A-1B. Alternatively, in other embodiments, the one or more wheels 12 may be of one or more different sizes and/or have one or more different functions. For example, all of the one or more wheels 12 may be the same functions. In another example, the certain ones of the one or more wheels 12 may be larger than certain other ones of the one or more wheels 12.

Figure 2:
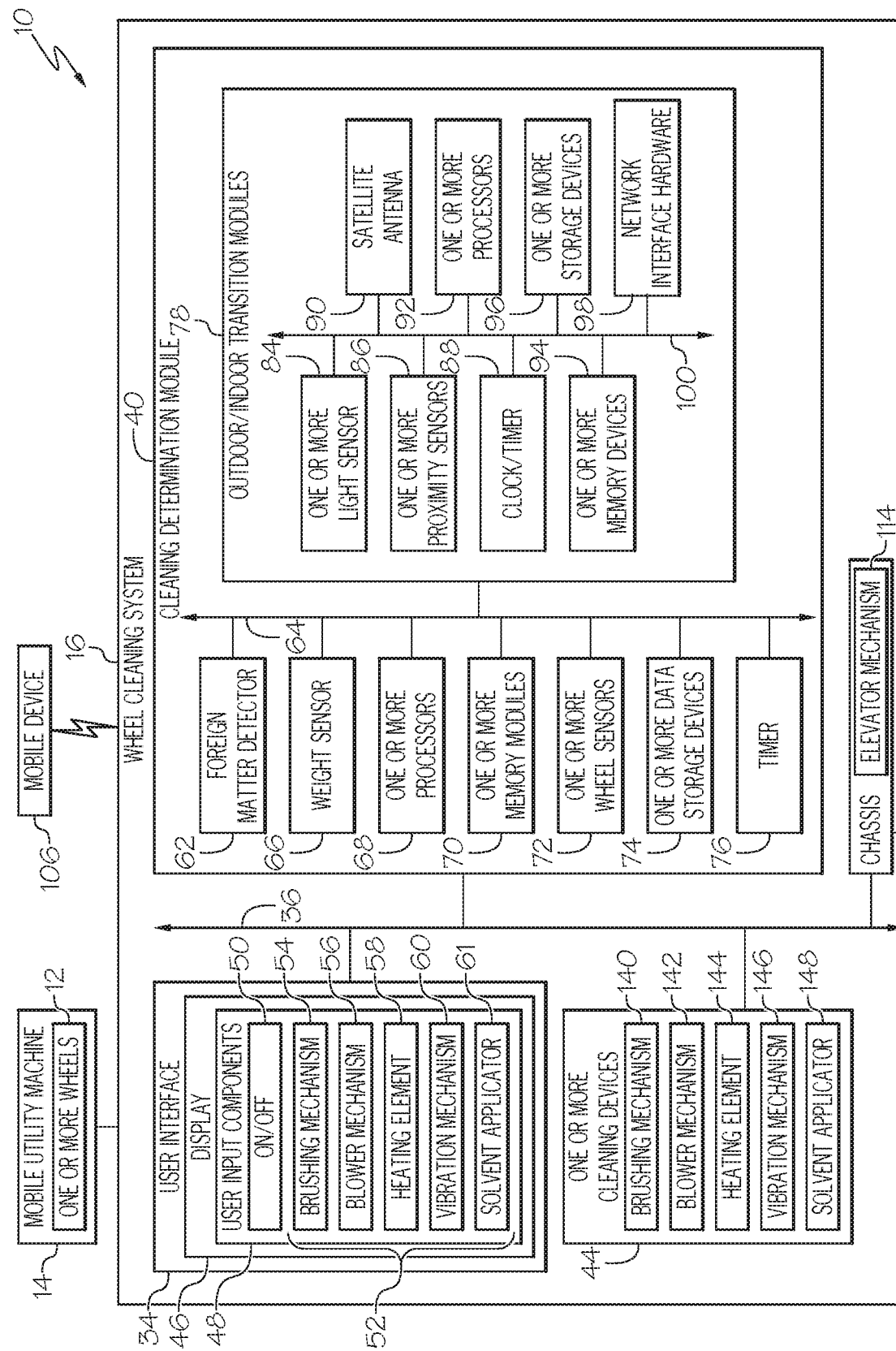
FIG. 2 depicts a block diagram of illustrative hardware components of a system for automatically cleaning one or more wheels according to one or more of the embodiments shown and described herein.

Referring to FIG. 2, the wheel cleaning system 16 will now be discussed. In some embodiments, the wheel cleaning system 16 may be configured to automatically clean the one or more wheels 12 of the mobile utility machine. In some embodiments, the wheel cleaning system 16 may include a user interface 34, a communication path 36, a cleaning determination module 40, a chassis 42, and one or more cleaning devices 44. The user interface 34 and the one or more cleaning devices 44 may be communicatively coupled to the cleaning determination module 40. Additionally, the chassis 42 and the one or more cleaning devices 44 may be mechanically coupled as shown in FIGS. 1A and 1B. The various components and hardware of the wheel cleaning system 16 and the interaction thereof will be described in detail below.

As shown in FIG. 2, in some embodiments, the wheel cleaning system 16 may include the user interface 34. In some embodiments, the user interface 34 may be in communication with the cleaning determination module 40 via the communication path 36. In one or more embodiments, the system 10 may not include the user interface 34. In some embodiments, the user interface 34 may incorporate a display device 46, such as, for example, a light emitting diode (LED) display, an organic LED (OLED) display, an active-matrix organic light emitting diode (AMOLED) display, a liquid crystal display (LCD), a thin film transistor (TFT) LCD, an in-place switching (IPS) LCD, a touchscreen LCD, and/or any other display technology now known or later developed. In one or more embodiments, the user interface 34 may permit information from the communication path 36 to be displayed on the display in audio, visual, graphic, or alphanumeric format.

In one or more embodiments, the user interface 34 may include one or more user input components 48 that may be configured to allow a user to interact with the user interface 34 and control the one or more cleaning devices 44. For example, a user operating the one or more user input components 48 may change settings, adjust particular images to be viewed, scroll through information, toggle features, provide feedback, and/or the like. Moreover, in some embodiments, the one or more user input components 48 may be configured to allow for transmission to and receipt of data from input devices such as a keyboard, a mouse, a joystick, a touch screen, a remote control, a pointing device, a video input device, an audio input device, a haptic feedback device, buttons, switches, knobs, touch-sensitive pads, microphones, and/or the like. The user interface 34 may be used, for example, to allow a user to interact with the one or more cleaning devices 44 via the cleaning determination module 40 or any component thereof.

Still referring to FIG. 2, in one or more embodiments, the one or more user input components 48 may include an ON/OFF activation device 50. In some embodiments, the ON/OFF activation device 50 may be defined as any circuit, mechanism, graphical interface, or the like. In one or more embodiments, the ON/OFF activation device 50 may be configured to send an ON signal to activate the wheel cleaning system 16 in order to clean the one or more wheels 12. In a similar manner, the ON/OFF activation device 50 may also be configured to send an OFF signal to deactivate the wheel cleaning system 16 in order to prohibit the cleaning of the one or more wheels 12. In some embodiments, the activation device 50 may include a graphical interface switch. In one or more embodiments, the graphical interface switch may resemble a graphical ON/OFF button. In some embodiments, the ON/OFF activation device 50 may include an ON position and an OFF position. In one or more embodiments, in ON position, the ON/OFF activation device 50 may generate a signal to be sent to the cleaning determination module 40 indicating that the wheel cleaning system 16 is activated. In the OFF position, the ON/OFF activation device 50 may generate a signal to be sent to the cleaning determination module 40 indicating that the wheel cleaning system 16 is deactivated. For example, if the ON/OFF activation device 50 is in the ON position, the cleaning determination module 40 may receive a signal indicating that the wheel cleaning system 16 is active and determine whether to direct the one or more cleaning devices 44 to clean the one or more wheels 12. On the other hand, if the ON/OFF activation device 50 is in the OFF position, the cleaning determination module 40 may receive a signal indicating that the wheel cleaning system 16 is inactive and stop determining whether to direct the one or more cleaning devices 44 to clean the one or more wheels 12 until the ON signal is received.

In some embodiments, the one or more user input components 48 may include one or more cleaning device buttons 52. In one or more embodiments, the one or more cleaning device buttons 52 may be associated with the one or more cleaning devices 44. In some embodiments, the one or more cleaning device buttons 52 may output a request signal to the communication path 36. For example, the one or more cleaning device buttons 52 may output a request signal to request that the cleaning determination module 40 direct the one or more cleaning devices 44 to clean the one or more wheels 12.

In some embodiments, each of the one or more cleaning device buttons 52 may be configured with a specific signal to identify a specific cleaning device of the one or more cleaning devices 44 associated with the wheel cleaning system 16. In some embodiments, the request signal may include a type of cleaning device and a request for cleaning the one or more wheels 12. In one or more embodiments, the one or more graphical cleaning device buttons 52 may include a brushing mechanism button 54, a blower mechanism button 56, a heater element button 58, a vibration mechanism button 60, a solvent applicator button 61, or any combination thereof as shown in FIG. 2. For example, if a system has the one or more cleaning devices 44 such as a brushing mechanism 140 and a solvent applicator 148, a user may select the brushing mechanism 140 by engaging the brushing mechanism button 54 and, in response, the one or more graphical cleaning device buttons 52 may output a signal indicative of requesting the one or more wheels 12 to be cleaned using the brushing mechanism 140. In response to receiving the signal, the cleaning determination module 40 may direct the brushing mechanism 140 of the one or more cleaning devices 44 to clean the one or more wheels 12. Some embodiments may not include the one or more graphical cleaning device buttons 52. The one or more cleaning devices including the brushing mechanism 140 and the solvent applicator 148 will be further discussed in more detail below.

Still referring to FIG. 2, the wheel cleaning system 16 may include the communication path 36 in some embodiments. In one or more embodiments, the communication path 36 may be formed from any medium that is capable of transmitting a signal such as, for example, conductive wires, conductive traces, connectors, and buses that cooperate to permit the transmission of optical waveguides and electrical data signals to components such as processors, memory devices, input devices, output devices, communication devices and various components and hardware of the system 10. In some embodiments, the communication path 36 may facilitate the transmission of wireless signals, such as Wi-Fi, Bluetooth, Near Field Communication (NFC), and the like. Moreover, the communication path 36 may be formed from a combination of mediums capable of transmitting signals. Additionally, it is noted that the term "signal" means an electronic photograph image, a waveform (e.g., electrical, optical, magnetic, mechanical or electromagnetic), such as DC, AC, sinusoidal-wave, triangular wave, square-wave, vibration, and the like, capable of traveling through a medium. The communication path 36 communicatively couples the various components, modules, devices, and hardware of the system 10. As used herein, the term "communicatively coupled" means that coupled components are capable of exchanging data signals with one another such as, for example, electrical signals via a conductive medium, electromagnetic signals via air, optical signals via optical waveguides, and the like.

An example cleaning determination module 40 will now be discussed as used in some embodiments. In some embodiments, the cleaning determination module 40 may include a foreign matter detector 62, a communication path 64, a weight sensor 66, one or more processors 68, one or more memory modules 70, one or more data storage devices 74, one or more wheel sensors 72, and an outdoor/indoor transition module 78. The foreign matter detector 62, the weight sensor 66, the one or more processors 68, the one or more memory modules 70, the one or more data storage devices 74, the timer 76 and the outdoor/indoor transition module 78 may be coupled to the communication path 64. The various components and hardware of the cleaning determination module 40 and the interaction thereof will be described in detail below.

An example foreign matter detector 62 of the cleaning determination module 40 will now be discussed as used in some embodiments. In some embodiments, the foreign matter detector 62 may be communicatively coupled to the one or more processors 68. In one or more embodiments, the foreign matter detector 62 may be mounted within the one or more cleaning devices 44 (FIGS. 4A-4E) and positioned adjacent to the one or more wheels 12. In some embodiments, the foreign matter detector 62 may include one or more visual sensor devices configured to sense an amount of foreign matter on a surface 126 of the one or more wheels 12. In a non-limiting example, the one or more visual sensors may include foreign matter detector 62. In some embodiments, the foreign matter detector 62 may be coupled to the communication path 64 and communicate with the other components of the cleaning determination module 40 and system 10. In one or more embodiments, the foreign matter detector 62 may be mounted to the one or more cleaning devices 44 such that foreign matter detector 62 may have an unobstructed view of the one or more wheels 12 and protected from various environmental elements including foreign matter. In some embodiments, the foreign matter detector 62 may be configured to capture one or more images of the surface 126 of the one or more wheels 12. In some embodiments, the one or more memory modules 70 may include instructions for processing images received from the foreign matter detector 62. For example, the one or more processors 68 may implement the instructions in the one or more memory module 70 to process an image from the foreign matter detector 62 to identify objects and foreign matter in the image. In some embodiments, the one or more processors 68 may compare a received image to a stored image for the one or more wheels 12 stored in the one or more data storage devices 74.

For example, in response to receiving an image from the foreign matter detector 62, the cleaning determination module 40 may use an image difference process to determine whether foreign matter exists on the one or more wheels 12. More specifically, the cleaning determination module 40 may receive the image from foreign matter detector 62 and compare the received image with a sample image for the one or more wheels. The cleaning determination module 40 may map the colors of the received image to the colors of the stored image and determine if a difference exists between the received image and the storage image. If a difference exists, the cleaning determination module 40 may determine if the difference is greater than a predetermined threshold. If the amount of pixel difference is above a predetermined threshold amount, then the cleaning determination module 40 may determine to direct the one or more cleaning devices 44 to clean the one or more wheels 12.

Still referring to FIG. 2, an example communication path 64 of the cleaning determination module 40 will now be discussed as used in some embodiments. In one or more embodiments, the communication path 64 may be formed from any medium that is capable of transmitting a signal such as, for example, conductive wires, conductive traces, connectors, and buses that cooperate to permit the transmission of optical waveguides and electrical data signals to components such as processors, memory devices, input devices, output devices, communication devices and various components and hardware of the system 10. In some embodiments, the communication path 64 may facilitate the transmission of wireless signals, such as Wi-Fi, Bluetooth, Near Field communication (NFC), and the like. Moreover, the communication path 64 may be formed from a combination of mediums capable of transmitting signals. In some embodiments, the communication path 64 communicatively couples the various components, modules, devices, and hardware of the system 10.

In some embodiments, the cleaning determination module 40 may include the weight sensor 66. In some embodiments, the cleaning determination module 40 may not include the weight sensor 66. In one or more embodiments, the weight sensor 66 may be coupled to the communication path 64. In some embodiments, the weight sensor 66 may measure output a signal indicative of an amount of a weight of an object or a user on the power base 24 to the one or more processors 68. In one or more embodiments, the one or more memory modules 70 may include instructions for determining if a user is sitting in the chair of the wheelchair 20. In some embodiments, the cleaning determination module 40 continues receiving weight information from the weight sensor 66 that measures the weight of the user in order to recognize if a user is occupying on the chair. For example, once the cleaning determination module 40 determines that the user is occupying the chair, the cleaning determination module 40 may use the signal output by the weight sensor 66 to determine whether to direct the one or more cleaning devices 44 to clean the one or more wheels 12. In some embodiments, the cleaning determination module 40 may not direct the one or more cleaning devices 44 to clean the one or more wheels 12 if the wheelchair 20 is not occupied by a user or the weight is not above a predetermined threshold.

In some embodiments, the cleaning determination module 40 may include the one or more processors 68. The one or more processors 68 may each be any device capable of executing machine-readable instructions. Accordingly, each of the one or more processors 68 may be a controller, an integrated circuit, a microchip, a computer, or any other computing device. The one or more processors 68 are communicatively coupled to the other components of the cleaning determination module 40 by the communication path 64. Accordingly, the communication path 64 may communicatively couple the one or more processors 68 with one another, and allow the components coupled to the communication path 64 to operate in a distributed computing environment. Specifically, each of the components may operate as a node that may send and/or receive data.

As shown in FIG. 2, in some embodiments, the cleaning determination module 40 may include the timer 76, such as an electronic timer. In one or more embodiments, the cleaning determination module 40 may not include the timer 76. In some embodiments, the timer 76 may be a control device that automatically starts or stops a system, machine, device, component, or apparatus being used within the outdoor/or indoor transition module 78 after a predetermined time interval. In one or more embodiments, the timer 76 may be set to a predetermined period of time, for example, 30 minutes. For example, the cleaning determination module 40 may start the timer 76 after it has directed the one or more cleaning devices 44 to clean the one or more wheels 12, and in response, the timer stop the cleaning determination module 40 from directing the one or more cleaning devices 44 until after the predetermined time interval, for example 30 minutes. In other words, the cleaning determination module 40 may not direct the one or more cleaning devices to clean the one or more wheels 12 until a signal is received from the timer 76 indicating that the predetermined time has expired.

In one or more embodiments, the cleaning determination module 40 may include one or more wheel speed sensors as shown in FIG. 2. In one or more embodiments, the one or more wheel sensors 72 may include any device or mechanism capable of detecting or monitoring the acceleration of motion or rotation of the one or more wheels 12. In some embodiments, the one more wheel sensors 72 may include one or more speed sensors and/or one or more accelerometers. In one or more embodiments, the one or more wheel sensors 72 may be coupled to and mounted on one or more wheels 12, and configured to monitor the rotation of one or more wheels 12. In some embodiments, the one or more processors 68 of the cleaning determination module 40 may evaluate the continuity between two or more wheels, and thereby, determine that the mobile utility machine is in motion and operation in order to conduct cleaning of the one or more wheels 12.

In one or more embodiments, the one or more wheel sensors 72 may be coupled to at least two wheels, a first wheel 80 and a second wheel 82. The one or more wheel sensors 72 may be coupled to the drive shaft for the first wheel 80 and a drive shaft of the second wheel 82. For example, when the cleaning determination module 40 receives a signal from the one or more wheel sensors 72, the cleaning determination module 40 may determine that the at least two wheels are simultaneously in motion, and in response direct the one or more cleaning devices 44 to clean the one or more wheels 12. On the other hand, if the cleaning determination module 40 does not simultaneously receives the first signal from the first wheel sensors 72 and the second signal from the second wheel sensors 72, the cleaning determination module 40 may not direct the one or more cleaning devices 44 to clean the one or more wheels 12. Some embodiments of the present disclosure may not include the one or more wheel sensors 72 72.

Still referring to FIG. 2, in some embodiments, the cleaning determination module 40 may include the one or more memory modules 70. The one or more memory modules 70 may be coupled to the communication path 64 and communicatively coupled to the one or more processors 68. The one or more memory modules 70 may comprise RAM, ROM, flash memories, hard drives, or any device capable of storing machine-readable instructions such that the machine-readable instructions can be accessed and executed by the one or more processors 68. The machine readable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable instructions and stored on the one or more memory modules 70. Alternatively, the machine readable instructions may be written in a hardware description language (HDL), such as logic implemented via either a field programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

In some embodiments, the machine-readable instructions may include cleaning determination logic instructions. The cleaning determination logic instructions may be executed by the one or more processors 68 of the cleaning determination module 40 in order to determine when to direct the one or more cleaning devices 44 to clean the one or more wheels 12. In other words, the cleaning determination module 40 may direct the one or more cleaning devices 44 to clean the one or more wheels 12 based on the occurrence of any one or more of the following states or conditions: (1) a signal, from the outdoor/indoor transition module 78, indicating that the mobile utility machine is approaching a transition from an outdoor environment to an indoor environment, (2) a signal, from the foreign matter detector 62, indicating that foreign matter is present on the one or more wheels 12, (3) a signal or condition, from the timer 76, indicating that no timed interval has been expired from the timer 76, (4) a signal, from the wheel sensors 72, indicating that at least one wheel is rotating, (5) ON activation signal, from the user interface 34, (6) a signal, the one or more wheel sensors 72, indicating that weight information is above a threshold has been received from, or (7) a signal, from the user interface 34, indicating a request for the one or more wheels 12 to be cleaned has been received.

As shown in FIG. 2, the cleaning determination module 40 may include the one or more data storage devices 74 in some embodiments. In one or more embodiments, the one or more data storage devices 74 may generally include a storage medium and may contain one or more data repositories for storing data that is received and/or generated. In some embodiments, the one or more data storage devices 74 may be any physical storage medium, including but not limited to, a hard disk drive (HDD), memory removable storage, and/or the like. Illustrative data that may be contained within the one or more data storage devices 74 may include at least one photo of the one or more wheels 12 without any foreign matter present. In some embodiments, the data storage devices 74 may include a plurality of images or photos taken over a period of time, such as an hour, a day, a week, a month, or a year.

Still referring to FIG. 2, in some embodiments, the cleaning determining module may include the outdoor/indoor transition module 78. In one or more embodiments, the outdoor/indoor transition module 78 may include one or more light sensors 84, one or more proximity sensors 86, a clock 88, a satellite antenna 90, one or more processors 92, one or more memory modules 94, one or more data storage devices 96, a communication path 100 and a network interface hardware 98. In some embodiments, the satellite antenna 90, one or more light sensors 84, the one or more proximity sensors 86, the clock 88, the one or more wheels sensors, the one or more processors 92, the one or more memory modules 94, the one or more data storage devices 96 may be coupled to the communication path 100 and communicatively coupled to one or more components of the system 10.

Figure 3A:
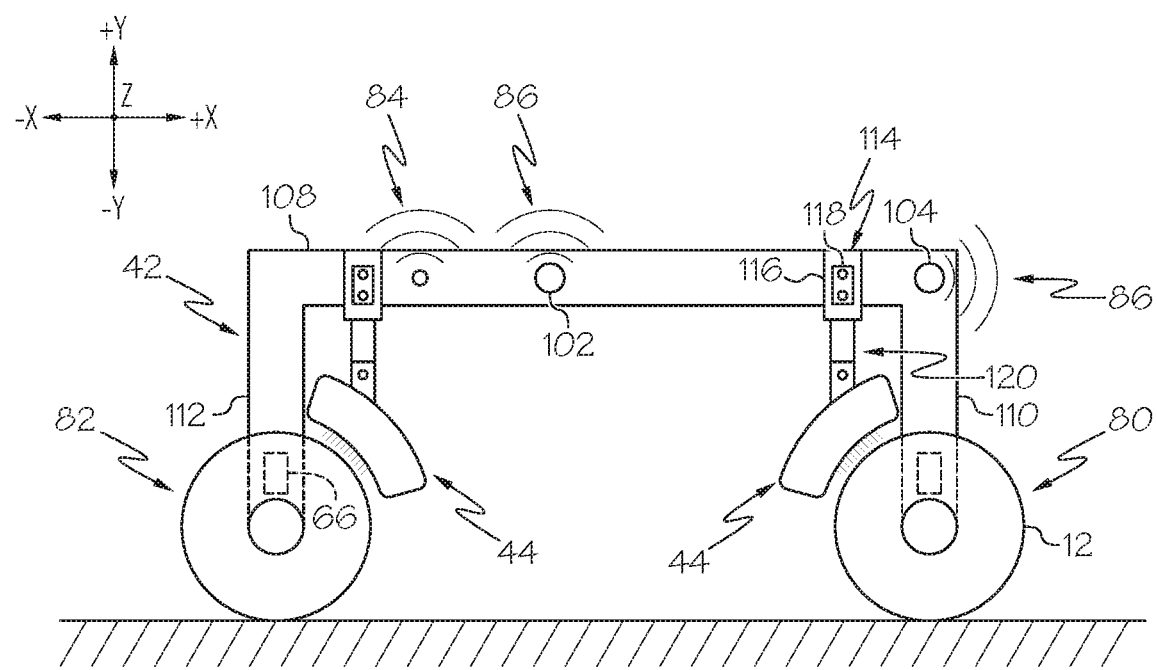
FIG. 3A schematically depicts an illustrative chassis having one or more cleaning devices according to one or more embodiments disclosed and shown herein.

In one or more embodiments, the outdoor/indoor transition module 78 may include the one or more light sensors 84. As shown in FIGS. 1A-1B and 3A for example, the one or more light sensors 84 may be mounted on the chassis 42 of the mobile utility machine to detect the intensity and different incident angles of outdoor sunlight and positioned to maintain an unobstructed view of sunlight. In one or more embodiments, the one or more light sensors 84 may be any device capable of outputting a signal indicating an intensity of sunlight within the visible and invisible spectrum (i.e. infrared and ultraviolet). In some embodiments, the one or more light sensors 84 may include a light dependent sensor, a photo diode sensor, or the like. In some embodiments, the one or more light sensors 84 may be one or more imaging devices that capture images (either still images or moving images). In one or more embodiments, the one or more light sensors 84 may output a signal indicating a type of environment that the mobile utility machine may be located. For example, referring again to FIG. 2, the one or more processors 92 of the outdoor/indoor transition module 78 may be configured to receive a signal from the one or more light sensors 84 indicative of the environment experienced by the mobile utility machine, and, in response, determine whether the mobile utility machine is located in an outdoor environment, a semi-environment, a state of approaching an indoor environment, and an indoor environment. In some embodiments, the one or more processors 92 of the outdoor/indoor transition module 78 may receive a signal from the one or more light sensors 84 that includes image data, apply image recognition software to the image data to determine one or more objects in the images, determine whether the one or more objects correspond to known objects indicating a transition (e.g., a door, a door frame, or the like), and in response, determine whether the mobile utility machine is approaching a transition.

In some embodiments, a signal from the one or more light sensors 84 may indicate an outdoor environment, a semi-outdoor environment, and an indoor environment. In one or more embodiments, an outdoor environment may be defined as an environment where the one or more light sensors 84 are not located under a shelter or covering and outside of a building. In some examples, the one or more light sensors 84 may output a light signal of a light intensity reading above 10,000 Lux indicating an outdoor environment. In some embodiments, a semi-outdoor environment may be defined as an environment that is may be partially indoors such as a corridor, under an awning or porch covering. In some examples, the one or more light sensors 84 may output a light signal having of a light intensity reading between 1,000 Lux and 10,000 Lux indicating the semi-environment. In one or more embodiments, an indoor environment may be defined as an environment where the one or more light sensors 84 may be located within a building or shelter. In one or more examples, the one or more light sensors 84 may output a signal with a light intensity reading within an interval from 100 Lux to 1000 Lux indicating an indoor environment. In some embodiments, the outdoor/indoor transition module 78 may not include the one or more light sensors 84. It is contemplated that image data containing images of various indoor and outdoor objects can be obtained and used, via image processing software and object recognition software, to determine an indoor or an outdoor location.

Referring still to FIG. 2, in some embodiments, the outdoor/indoor transition module 78 may include the one or more proximity sensors 86. In some embodiments, the one or more proximity sensors 86 may be coupled to the communication path 100. In one or more embodiments, the one or more proximity sensors 86 may detect a distance between the one or more proximity sensors 86 and an object nearby and communicate the proximity information to the one or more processors 92. In some embodiments, the one or more proximity sensors 86 may be any device capable of outputting a proximity signal indicative of the proximity of an object to the one or more proximity sensors 86. In some embodiments, the one or more proximity sensors 86 may include laser scanners, capacitive displacement sensors, Doppler Effect sensors, eddy-current sensors, ultrasonic sensors, magnetic sensors, optical sensors, radar sensors, sonar sensors, LIDAR sensors, or the like. In some embodiments, the outdoor/indoor transition module 78 may be configured to determine the presence and/or distance of an obstacle and it is proximate to the mobile utility machine based on a signal from the one or more proximity sensors 86. In one or more embodiments, the one or more proximity sensors 86 may output a signal indicating that an object or obstacle is within a distance of the one or more proximity sensors 86. Based on the identified obstacle, the outdoor/indoor transition module 78 may determine whether the mobile utility machine is approaching a transition from an outdoor environment to an indoor environment and, in response, output a signal to the communication path 64 of the cleaning determination module 40. Some embodiments may not include the one or more proximity sensors 86.

In some embodiments, the one or more proximity sensors 86 may include a first proximity sensor 102 as shown in FIGS. 1A-1B and 3A, for example. In one or more embodiments, the first proximity sensor 102 may be located adjacent to the one or more light sensors 84, such that the first proximity sensor 102 may have the same view as the one or more light sensors 84. In some embodiments, the first proximity sensor may output a signal to the one or more processors 92 via the communication path 100 indicating whether the view of the one or more light sensors 84 has been obstructed. For example, the one or more processors 92 of the outdoor/indoor transition module 78 may receive a signal from the first proximity sensor indicating that an object has obstructed its view, and in response, determine that the signal received by the one or more light sensors 84 may be compromised. On the other hand, the one or more processors 92 may receive a signal from the first proximity sensor indicating that its view is unobstructed, and in response, use the signal from the one or more light sensors 84 to determine whether the mobile utility machine is approaching a transition from an outdoor environment to an indoor environment. Some embodiments may not include the first proximity sensor.

In some embodiments, the one or more proximity sensors 86 may include a second proximity sensor 104 as shown in FIGS. 1A-1B and 3A, for example. In some embodiments, the second proximity sensor 104 may be located on the chassis 42 near a front of the mobile utility machine, such that the second proximity sensor 104 can view a forward direction of the mobile utility machine. In one or more embodiments, the second proximity sensor 104 may output a signal when the mobile utility machine is moving toward an object such as a building. For example, the one or more processors 92 of the outdoor/indoor transition module 78 may receive a signal from the second proximity sensor 104 indicating that the mobile utility machine is within six feet or less of an object, and in response, determine whether the mobile utility machine is approaching a transition from an outdoor environment to an indoor environment. Some embodiments may not include the second proximity sensor 104.

Referring again to FIG. 2, in some embodiments, the outdoor/indoor transition module 78 may include the clock 88. In some embodiments, the clock may include a system clock. In one or more embodiments, the clock 88 may be coupled to the communication path 100 and in communication with one or more devices or components of the cleaning determination module 40 or the system 10. In some embodiments, the clock 88 may include any electronic device in the system 10 that issues a steady high-frequency signal that synchronizes all of the internal components and devices of the cleaning determination module 40 and/or the system 10. For example, if the one or more processors 92 of the outdoor/indoor transition module 78 receive a light signal indicating that the light intensity is about or near 1000 Lux from the one or more light sensors 84, the outdoor/indoor transition module 78 may receive a signal indicating the time of day from the clock 88 in order to determine whether to rely on the signal from the one or more light sensors 84 in determining whether the mobile utility machine is approaching an indoor transition from an outdoor transition. For example, the outdoor/indoor transition module 78 may receive a signal from the one or more light sensors 84, and in response, determine whether to use the signal from the one or more light sensors 84 based on the time of day. In some embodiments, the outdoor/indoor module may not include the clock 88. One reason for this is that signals from the one or more light sensors, after around or about midnight until 0500 hours, may have a light intensity below 1,000 Lux. As such, those signals may give the appear that the mobile utility machine is in an indoor environment when in fact, the mobile utility machine may be located in an outdoor environment.

Referring again FIG. 2, in some embodiments, the outdoor/indoor transition module 78 may include the satellite antenna 90. The satellite antenna 90 may be coupled to the communication path 100 such that the communication path 100 is communicatively couples the satellite antenna 90 to one or more global positioning system satellites. Specifically, in one or more embodiments, the satellite antenna 90 may include one or more conductive elements that interact with electromagnetic signal transmitted by global positioning systems satellites. The received signal is transformed into a data signal indicative of a location (e.g. latitude and longitude) of the satellite antenna 90 by the one or more processors 92. The data signal may be used to determine the location of the mobile utility machine relative to objects, such as buildings or specific address locations. Some embodiments may not include the satellite antenna 90.

Still referring to FIG. 2, in some embodiments, the outdoor/indoor transition module 78 may include the communication path 100 in some embodiments. In one or more embodiments, the communication path 100 may be formed from any medium that is capable of transmitting a signal such as, for example, conductive wires, conductive traces, connectors, and buses that cooperate to permit the transmission of optical waveguides and electrical data signals to components such as processors, memory devices, input devices, output devices, communication devices and various components and hardware of the system 10. In some embodiments, the communication path 100 may facilitate the transmission of wireless signals, such as Wi-Fi, Bluetooth, Near Field Communication (NFC), and the like. Moreover, the communication path 100 may be formed from a combination of mediums capable of transmitting signals. The communication path 100 communicatively couples the various components, modules, devices, and hardware of the system 10.

In one or more embodiments, the outdoor/indoor transition module 78 may include the one or more processors 92, each may be any device capable of executing machine-readable instructions. Accordingly, each of the one or more processors 92 may be a controller, an integrated circuit, a microchip, a computer, or any other computing device. The one or more processors 92 are communicatively coupled to the other components of the outdoor/indoor transition module 78 and the system 10 by the communication path 100. Accordingly, the communication path 100 may communicatively couple the one or more processors 92 with one another, and allow the components coupled to the communication path 100 to operate in a distributed computing environment. Specifically, each of the components may operate as a node that may send and/or receive data.

In some embodiments, the outdoor module/indoor transition module may include the one or more memory modules 94. The one or more memory modules 94 may be coupled to the communication path 100 and communicatively coupled to the one or more processors 92. The one or more memory modules 94 may comprise RAM, ROM, flash memories, hard drives, or any device capable of storing machine-readable instructions such that the machine-readable instructions can be accessed and executed by the one or more processors 92. The machine readable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable instructions and stored on the one or more memory modules 94. Alternatively, the machine readable instructions may be written in a hardware description language (HDL), such as logic implemented via either a field programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

In some embodiments, the machine-readable instruction may include outdoor/indoor transition logic instructions, to be executed by the one or more processors 92. For example, the one or more processors 92 may execute the outdoor/indoor logic instructions and, in response, determine if the mobility utility machine is approaching transition from an outdoor environment to an indoor environment based on one or more of the following conditions or states: (1) a signal, from the one or more lights sensors, indicating that the light level is between a predetermined range, such as 1000 Lux to 10,000 Lux, (2) a signal, from the clock 88, indicating that the time of day between a predetermined time interval, such as 0500 and 2100 hours, (3) a satellite signal, from the satellite antenna 90, indicating that the mobile utility machine is within a predetermined distance, such as 10 ft., from an address location of a building, (4) a signal, from the first proximity sensor, indicating that the one or more light sensors 84 has an unobstructed view, and (4) a signal, from the second proximity sensor 104, indicating that mobile utility machine is approaching an object, such as a building and is within a predetermined d, such as 10 ft. or less.

In one or more embodiments, the outdoor/indoor transition module 78 may include the one or more data storage devices 96. In some embodiments, the one or more data storage devices 96, which may generally be a storage medium, may contain one or more data repositories for storing data that is received and/or generated. In some embodiments, the one or more data storage devices 96 may be any physical storage medium, including but not limited to, a hard disk drive (HDD), memory removable storage, and/or the like. Illustrative data that may be contained within the one or more data storage devices 96 may include at least one photo of the one or more wheels 12 in a clean state. In some embodiments, the data storage devices 96 may include a plurality of images or photos taken over a period of time, such as an hour, a day, a week, a month, or a year.

As shown in FIG. 2, in some embodiments, the outdoor/indoor transition module 78 include may include the network interface hardware 98. In one or more embodiments, the network interface hardware 98 may be communicatively coupled to the outdoor/indoor transition module 78, a mobile device 106, a remote server, or the user interface 34 of the wheel cleaning system 16. In some embodiments, the network interface hardware 98 may be coupled to the communication path 100, such that the communication path 100 communicatively coupled to the network interface hardware 98 to other devices or modules. In one or more embodiments, the network interface hardware 98 may be any device capable of transmitting and/or receiving data via a wireless network. Accordingly, the network interface hardware 98 may include a communication transceiver for sending and/or receiving data according to any wireless communication standard. For example, the network interface hardware 98 may include a chipset (e.g. antenna, processor, machine readable instructions, etc.) to communicate over wireless computer networks such as, for example, wireless fidelity (Wi-Fi), WiMax, Bluetooth, IrDA, Wireless USB, Z-Wave, ZigBee, or the like. In some embodiments, the network interface hardware 98 includes Bluetooth transceiver that enables the cleaning determination module 40 to exchange information with the mobile device 106 (e.g. smartphone) via the Bluetooth communication. For example, the network interface hardware 98 may receive a light sensor signal, a GPS signal, and/or an outdoor/indoor transition signal from the mobile device 106. Some embodiments, the outdoor/indoor transition module 78 may not include the network interface hardware 98.

In some embodiments, data from various applications running on a mobile device 106 may be provided from the mobile device 106 to the cleaning determination module 40 via the network interface hardware 98. In some embodiments, the mobile device 106 may be any device having hardware (e.g. chipsets, processors, memory, etc.) for communicatively coupling with the network interface hardware 98 and the network. Specifically, the mobile device 106 may include an antenna for communicating over one or more of the wireless network networks described herein. In addition, the mobile device 106 may include a mobile antenna for communicating with the network. Accordingly, the mobile antenna may be configured to send and receive data according to a mobile telecommunication standard of any generation (e.g. 1G, 2G, 3G, 4G, 5G, etc.). Specific examples of the mobile device 106 include, but are not limited to, smart phones, tablets devices, e-readers, laptop computers, or the like. In some embodiments, the mobile device 106 may include software applications for controlling the one or more cleaning devices 44. For example, a software application may send an instruction to cleaning device to clean the one or more wheels 12 of the mobile utility machine. In another example, the software application may send an instruction the cleaning determination module 40 that the mobile utility machine has entered into a semi-outdoor environment, such that the semi-outdoor environment is indicative of the mobile utility machine is approaching a transition from the outdoor environment to the indoor environment. In still another example, the software application may send the GPS location of the mobile utility machine.

Referring to FIG. 3A, in some embodiments, the wheel cleaning system 16 may include the chassis 42. In some embodiments, the chassis 42 may include any load-bearing framework of the one or more cleaning devices 44, which may structurally support the one or more cleaning devices 44 in its construction and function. In one or more embodiments, the chassis 42 may include a horizontal portion 108 and a first leg support 110 and a second leg support 112, where the first leg support 110 perpendicularly extends in a downward direction from a first end of the horizontal portion 108 and the second leg support 112 perpendicularly extends in the downward direction from a second end of the horizontal portion 108. The first leg support 110 may be coupled to a first wheel 80 of the one or more wheels 12 and the second leg support 112 may be coupled to a second wheel 82 of the one or more wheels 12.

Referring to FIGS. 2 and 3A, in some embodiments, the chassis 42 may include an elevator mechanism 114. The elevator mechanism 114 will now be discussed. In some embodiments, the elevator mechanism 114 may be coupled to the chassis 42 and positioned adjacent the one or more wheels 12. In one or more embodiments, the elevator mechanism 114 may include any device that may lower the one or more cleaning devices 44 (e.g., move the one or more cleaning devices 44 in the −y direction of the coordinate axes of FIG. 3A) to clean the one or more wheels 12 and to raise the one or more cleaning devices 44 away from the one or more wheels 12 (e.g., move the one or more cleaning devices 44 in the +y direction of the coordinate axes of FIG. 3A) after cleaning is complete. While the present embodiment discloses raising and lowering the one or more cleaning devices (e.g., in the +y/−y directions of the coordinate axes of FIG. 3A), the present disclosure is not limited to such. Any other motion that brings the one or more cleaning devices 44 in contact with the wheels 12 is contemplated and included within the scope of the present disclosure. In some embodiments, the wheel cleaning system 16 may not include the elevator mechanism 114. In some embodiments, the elevator mechanism 114 may include an electric actuator, such as an electric servo linear actuator. In some embodiments, the elevator mechanism 114 may include a motorized assembly 116 having a mounting end 118 and a rod 120. In one or more embodiments, the rod 120 may extend out of and retract into the motorized assembly 116 when a request signal is received. In some embodiments, the elevator mechanism 114 may be coupled the one or more cleaning devices 44 and the chassis 42 via a mounting bracket set such that the mounting end is affixed to the chassis 42 and the rod 120 is affixed to the one or more cleaning devices 44. In some embodiments, the elevator mechanism 114 may be coupled to the communication path 36 and receive instructions from the cleaning determination module 40.

For example, the one or more processors 68 of the cleaning determination module 40 may control the actuating of the rod 120 of the elevator mechanism 114, such as the rod 120 extended or the rod 120 being retracted. The one or more processors 68 of the cleaning determination module 40 may direct the one or more cleaning devices 44 to clean the one or more wheels 12 and, in turn, control the elevator mechanism 114 to lower the one or more cleaning devices 44 in a downward direction (e.g., in the −y direction of the coordinate axes of FIG. 3A) until the one or more cleaning devices 44 are within close proximity to the one or more wheels 12. In some embodiments, the one or more processors 68 may direct the elevator mechanism 114 to move the one or more cleaning devices 44 until the one or more cleaning devices 44 physically connects or substantially close to a surface 126 of the one or more wheels 12. In one or more embodiments, the one or more processors 68 of the cleaning determination module 40 may direct the elevator mechanism 114 to pull the one or more cleaning devices 44, in an upward direction (e.g., in the +y direction of the coordinate axes of FIG. 3A), away from the one or more wheels 12 until the one or more cleaning devices 44 is moved away from the one or more wheels 12 allowing distance between the one or more cleaning devices 44 and a surface 126 of the one or more wheels 12.

Figure 3B:
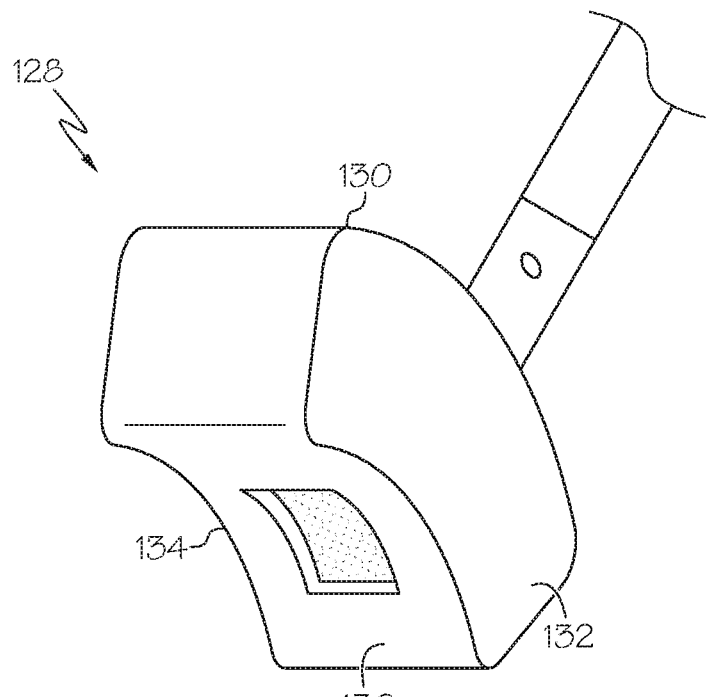
FIG. 3B schematically depicts an illustrative housing of a cleaning device according to one or more embodiments disclosed and shown herein.

Now referring to FIGS. 3A-3B, the wheel cleaning system 16 may include the one or more cleaning devices 44. The one or more cleaning devices 44 may be located and positioned adjacent to the one or more wheels 12 of the mobile utility machine in order to allow the one or more cleaning devices 44 to efficiently and effectively clean the one or more wheels 12. In some embodiments, the one or more cleaning devices 44 may be communicatively coupled to the cleaning determination module 40 as shown in FIG. 2. The one or more cleaning devices may be any device or mechanism able and capable of cleaning the one or more wheels 12.

Referring to FIG. 3B, the one or more cleaning devices 44 may be at least partially enclosed within a housing 128. The one or more cleaning devices 44 may be affixed within the housing 128 using any coupling and affixing mechanism. For example, the coupling and affixing mechanism may include, for example, bonding material, one or more brackets with bolts and nuts, and/or one or more clamps. In some embodiments, the housing 128 may be configured in any shape that provides a covering and protection for the one or more cleaning devices 44. The housing 128 may include a top 130, a first side 132, a second side 134, and a bottom shield 136 such that the first and second sides 132,134 extend from the top 130 to the bottom shield 136 of the housing 128. For example, the top of the housing 128 may be configured to cover the one or more cleaning devices 44 and allow the one or more cleaning devices 44 to be coupled to chassis 42. The top of the housing 128 may be rigidly affixed to the rod 120 of the elevator mechanism 114 using any coupling mechanism, such as a nut or mounting bracket. The bottom shield 136 of the housing 128 may be configured to cover and encompass at least a portion of the one or more cleaning devices 44, while still allowing the one or more cleaning devices 44 to engage and efficiently clean the one or more wheels 12.

Figure 4C:
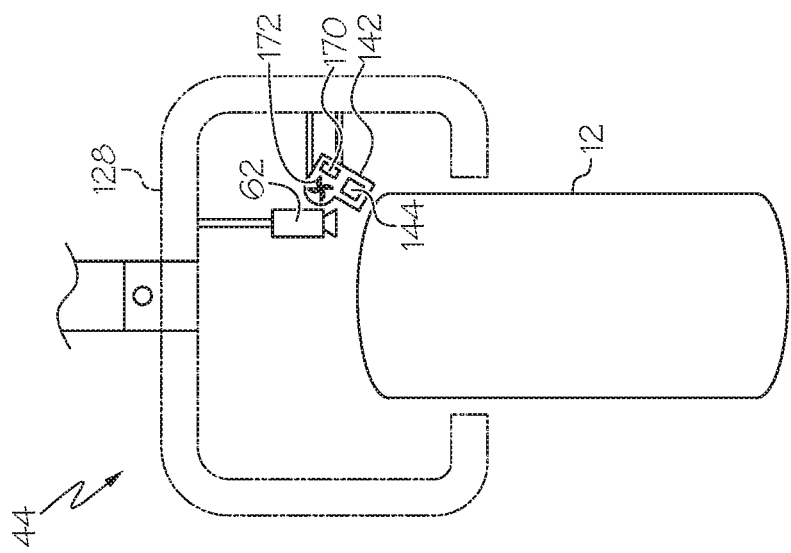
FIG. 4C schematically depicts yet another illustrative cleaning device including a foreign matter detector and a blower mechanism having a heating element according to one or more embodiments disclosed and shown herein.
Figure 4B:
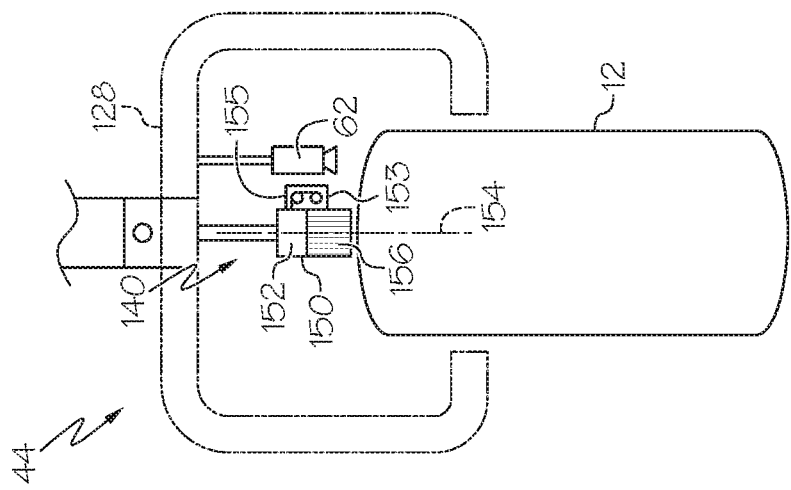
FIG. 4B schematically depicts another illustrative cleaning device having a brushing mechanism and a foreign matter detector according to one or more embodiments disclosed and shown herein.
Figure 4A:
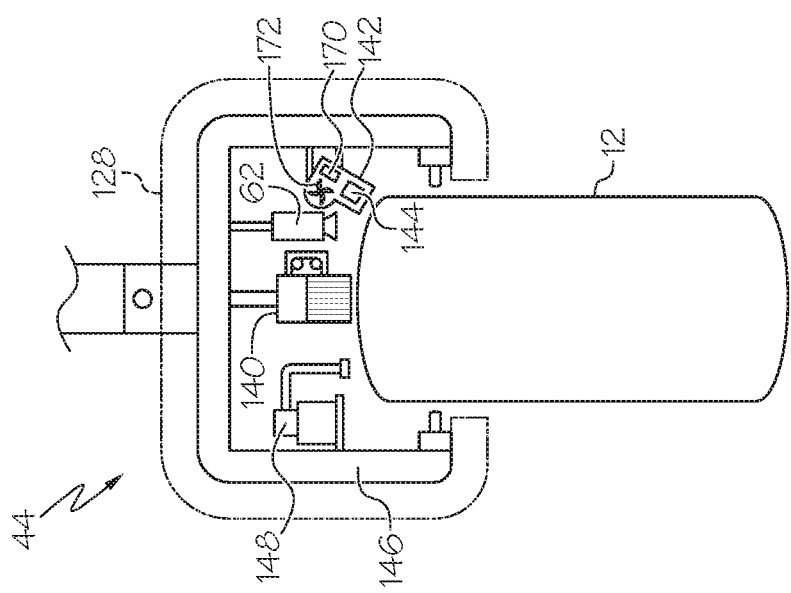
FIG. 4A schematically depicts an illustrative cleaning device having a vibration mechanism, a solvent applicator, a brushing mechanism, a foreign matter detector, and a blower according to one or more embodiments disclosed and shown herein.

FIGS. 4A-4E depict illustrative embodiments of various components of the one or more cleaning devices 44 26. The one or more cleaning devices 44 may be defined as any device, mechanism, component, or the like that is configured and either directly or indirectly engaged with the one or more wheels 12 to remove foreign matter and clean the one or more wheels 12. For example, as shown in FIG. 4A, the one or more cleaning devices 44 may include, but is not limited, as a brushing mechanism 140, a blower mechanism 142, a blower mechanism 142 with a heating element 144, a vibration mechanism 146, and a solvent applicator 148. While FIG. 4A depicts the one or more cleaning devices 44 such as having a plurality of cleaning devices 44 (e.g., the one or more cleaning devices 44 including the brush, the blower mechanism 142 with the heating element 144, the vibration mechanism 146, and the solvent applicator 148), the present disclosure is not limited to such. In some embodiments, the one or more cleaning devices 44 may only include one cleaning device. In one or more embodiments, the one or more cleaning devices 44 may include two or more cleaning devices 44.

As shown in an example embodiment of FIG. 4B, the one or more cleaning devices 44 may include the brushing mechanism 140. In still another example embodiment of FIG. 4C, the one or more cleaning devices 44 may include the blower mechanism 142. In yet another example embodiment of FIG. 4D, the one or more cleaning devices 44 may include the vibration mechanism 146. In another example embodiment of FIG. 4E, the one or more cleaning devices 44 may include the solvent applicator 148. The various features of the one or more cleaning device as depicted in FIGS. 4A-4E will now be described in detail below.

Figure 5:
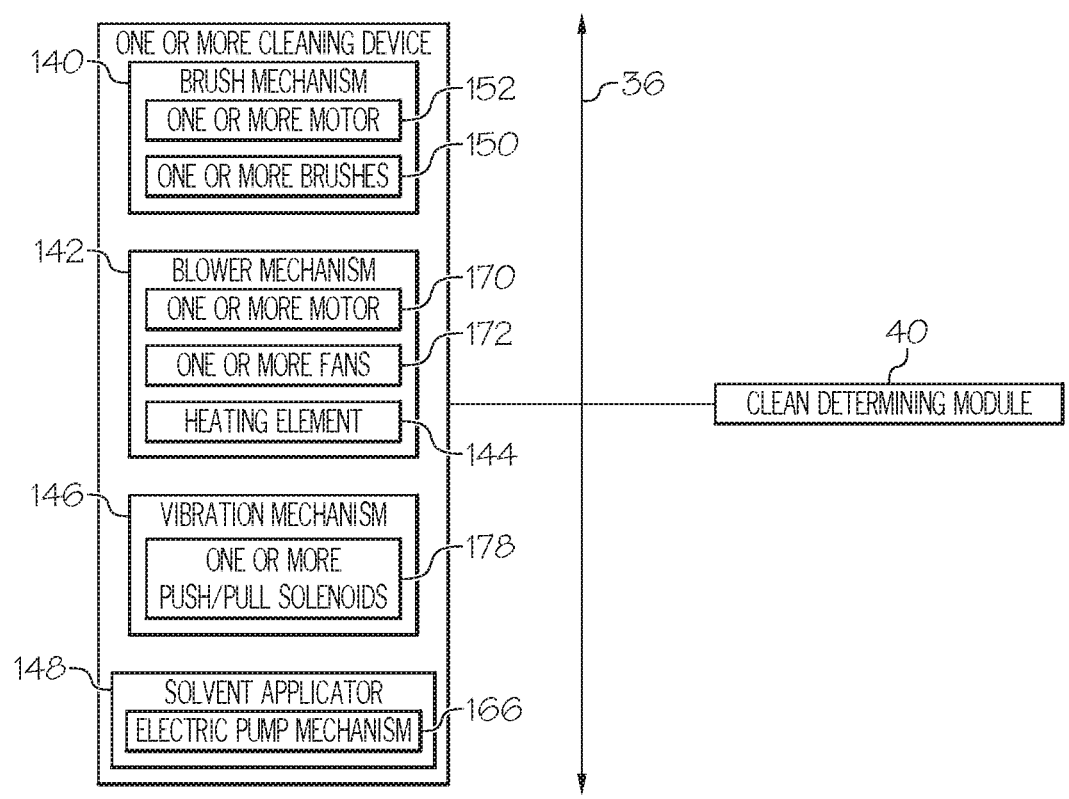
FIG. 5 depicts a block diagram of illustrative hardware components of a cleaning device according to one or more of the embodiments shown and described herein.

Referring to FIGS. 4B and 5, in some embodiments, the one or more cleaning devices may include the brushing mechanism 140. In some embodiments, the brushing mechanism 140 may be communicatively coupled to the cleaning determination module 40. In one or more embodiments, the brushing mechanism 140 may include one or more brushes 150 and one or more motors 152. In some embodiments, the brushing mechanism 140 may not include the one or more motors 152. In some embodiments, the one or more brushes 150 may be rotationally affixed to the housing 128 as shown in FIG. 4B. For example, the one or more brushes 150 may have a spindle axis 154 that is integrated and coupled to the one or more motors 152 via a driving belt, such that the one or more motor drives the spindle of the one or more brushes 150 and causes the one or more brushes 150 to rotate while cleaning the one or more wheels 12. Alternatively, in some embodiments, the one or more brushes 150 may be rigidly affixed to the housing 128 (not shown) and not able to rotate in any direction. In some embodiments, the one or more brushes 150 and the one or more motors 152 may be partially integrated within the housing 128 and covered by the shield. The housing 128 may protect the motor from any contamination, water, snow, or foreign material. In some embodiments, the brush may be partially enclosed by a shield in order to prevent foreign material from being spread in random directions when the brush is rotating.

Still referring to FIG. 4B, in some embodiments, the one or more brushes 150 may include any type of brush having bristles 156 capable of removing foreign matter from the one or more wheels 12. For example, the one or more brushes 150 may be one or more brushes 150 with stiff bristles 156 rigidly affixed to a spindle of the brush. In some embodiments, the bristles 156 may be made of any stiff and rigid material such as polyprolene, Palmyra, Tampico, nylon, stiff nylon, polyester, synthetic, and the like. In some embodiments, the one or more brushes 150 may be configured to travel in a clockwise rotation or the same rotational direction as the one or more wheels 12. In one or more embodiments, the one or more brushes 150 may be configured to travel in a counter-clockwise rotation or opposite rotational direction of the one or more wheels 12 in order to cause more friction and remove more foreign matter from the one or more wheels 12, as shown in FIG. 4B.

In one or more embodiments, the brushing mechanism 140 may include the one or more motors 152, such as one or more electric motors. Alternatively, the brushing mechanism 140 may not include the one or more motors 152. In some embodiments, the one or more motors 152 may be coupled to the spindle axis 154 of the one or more brushes 150 and provide torque to the spindle causing the spindle to rotate. In one or more embodiments, the one or more motors 152 may be communicatively coupled to the communication path 36 and configured to receive instructions from the cleaning determination module 40. In some embodiments, the cleaning determination module 40 may output a signal to control a rotation speed and/or a rotation direction of the one or more motors 152. For example, in response to receiving a signal, from the foreign matter detector 62, indicating possible foreign matter on the surface 126 of the one or more wheels 12, the cleaning determination module 40 may output a signal to control the rotational speed and/or rotation direction of the one or more motors 152 based on the received signal. In some embodiments, the signal to control the rotational speed and/or the rotational direction may be based on an amount of the foreign matter detected, such that the greater the amount of the foreign matter the faster the rotational speed or the lesser the amount of the foreign matter the slower the rotation speed. In one or more embodiments, the signal to control the rotation speed and/or rotation direction may be a consistent speed irrespective of the amount of the foreign matter detected on the surface 126 on the one or more wheels 12.

Now referring to FIGS. 4C and 5, in another non-limiting example embodiment, the one or more cleaning devices 44 may include the blower mechanism 142. In one or more embodiments, the blower mechanism 142 may be positioned and located partially within the housing 128. In some embodiments, the blower mechanism 142 may be affixed to the housing 128 using and coupling device. In one or more embodiments, the coupling device may include a set of mounting brackets. In some embodiments, the blower mechanism 142 may be communicatively coupled to the communication path 36. For example, the cleaning determination module 40 may operate and control the blower mechanism 142, and thereby, cause the blower mechanism 142 to blow air onto the one or more wheels 12 to blast foreign matter off of the one or more wheels 12. For example, while cleaning, the blower mechanism 142 may be configured to receive a signal, from the cleaning determination module 40, directing the blower mechanism 142 to blast air on the one or more wheels 12, and thereby, blow and remove foreign material from the one or more wheels 12.

In some embodiments, the blower mechanism 142 may be located adjacent and next to the one or more wheels 12. In one or more embodiments, this adjacent and next to position may allow the blower mechanism 142 to control and channel the direction of the airflow, and thereby, allow the airflow to directly contact to clean the one or more wheels 12. In one or more embodiments, the blower mechanism 142 may be positioned to allow a downward, a sideways, and/or a diagonal direction of direct airflow to the one or more wheels 12. In some embodiments, the blower mechanism 142 may include an electromechanical device that blows ambient air over the one or more wheels 12 to blow foreign matter off the one or more wheels 12. In one or more embodiments, the electromechanical device may include one or more motors and one or more fans 172 coupled within the housing 128 via a mounting bracket as shown in FIGS. 4B and 4C. In some embodiments, the housing 128 may partially enclose and protect all of the components of the blower mechanism 142. In one or more embodiments, the housing 128 may include a side portion 174 and a nozzle portion 176 to direct and control the airflow, from within the housing 128, over the one or more wheels 12. In some embodiments, the side portion 174 is configured to cover and protect the one or more motors and the one or more fans 172 and to act as a vent for an inflow of air. In one or more embodiments, the nozzle portion 176 is shaped and configured to concentrate the flow of air in the direction of the one or more wheels 12.

In one or more embodiments, the blower mechanism 142 may include the one or more motors 170, such as one or more electric motors. In some embodiments, the one or more motors 170 may be coupled to the spindle axis 154 of the one or more fans 172 and provide torque to the one or more fans 172. In one or more embodiments, the one or more motors 170 may be communicatively coupled to the communication path 36 and the clean determination module, and thereby, receive instructions from the cleaning determination module 40. For example, the cleaning determination module 40 may output a signal to control a rotation speed and a rotation direction of the one or more motors 170. In some embodiments, the cleaning determination module 40 may receive a signal, the foreign matter detector 62, indicating an amount of foreign matter on the one or more wheels 12 and control the rotational speed and rotation direction of the one or more motors 170 based on the amount of the foreign matter signal. Alternatively, in response to receiving the signal, from the foreign matter detector 62, indicating the amount of the foreign matter on the one or more wheels 12, the cleaning determination module 40 may send out a signal indicating a constant speed for the rotational speed of the one or more motors 170 irrespective of the amount of the foreign matter present on the surface 126 of the one or more wheels 12.

As shown in FIG. 4C, the blower mechanism 142 may include the one or more fans 172, such as one or more electric fans 172. In some embodiments, the one or more fans 172 may be coupled to the one or more motors 170 and be adapted to blow air out of the nozzle portion of the housing 128 onto the one or more wheels 12. The cleaning determination module 40 may control the rotation speed and the rotation direction of the one or more motors 170, and thereby, control a rotation speed and a rotation direction of the one or more fans 172. For example, the cleaning determination module 40 may receive a signal, from the foreign matter detector 62, indicating an amount of foreign matter is located on the one or more wheels 12 and control the rotational speed and rotational direction of the one or more motors 170 based on the amount of the foreign matter and, in turn, control and direct the one or more fans 172 to blow air over the one or more wheels 12 based on the amount of the foreign matter in order to remove the foreign matter and clean the one or more wheels 12. Alternatively, in response to receiving a signal, from the foreign matter detector 62, the cleaning determination module 40 may provide a signal to the one or more motor of a constant speed irrespective of the amount of the foreign matter found on the surface 126 of the one or more wheels 12 in some embodiments.

As shown in FIG. 4C, in some embodiments, the blower mechanism 142 may include the heating element 144. The heating element 144 may be located and housed within the blower mechanism 142. The heating element 144 may be configured to heat the air, blown by the one or more fans 172, to clean the foreign matter on the surface 126 of the one or more wheels 12. For example, in response to receiving a signal from the foreign matter detector 62, the cleaning determination module 40 may output a signal to control the heating element 144 of the blower mechanism 142, and thereby, heat the blasted air from the fan to blow and remove foreign material from the one or more wheels 12. In some embodiments, the blower mechanism 142 does not include the heating element 144.

Referring now to FIG. 4D, in still another non-limiting example embodiment, the one or more cleaning devices 44 may include the vibration mechanism 146. In some embodiments, the vibration mechanism 146 may include any device that causes the one or more wheels 12 to vibrate and remove foreign matter from the one or more wheels 12. In some embodiments, the vibration mechanism 146 may include one or more push and pull solenoids 178 and a fork assembly 180. In one or more embodiments, the one or more push and pull solenoids 178 may include a plunger 182 end and a solenoid assembly 183. The plunger 182 may extend outwardly from the solenoid assembly 183 and move in an in and out direction when the solenoid assembly 183 is activated. In some embodiments, the fork assembly 180 may include a first prong 184, a second prong 186, and a fork shaft 188 to mount within the housing 128. In some embodiments, the one or more push and pull solenoids 178 may be perpendicularly and horizontally coupled to each fork prong 184, 186. In some embodiments, each solenoid assembly 183 may be coupled to each of the fork prongs 184, 186 and the plunger 182 is configured to be capable of engaging the one or more wheels 12 via an in and out motion.

In one or more embodiments, each of the one or more push and pull solenoids 178 may be communicatively coupled to the communication path 36. For example, the cleaning determination module 40 may be configured to control the one or more push and pull solenoids 178, such that the plunger 182 may oscillate in and out of the solenoid assembly 183 and engage and vibrate the one or more wheels 12. In some embodiments, the cleaning determination module 40 may determine that the one or more cleaning devices 44 should clean the one or more wheels 12, and thereby, output a signal to the one or more push/pull solenoids 178 to clean the one or more wheels 12. In some embodiments, while cleaning the one or more wheels 12, the one or more push/pull solenoids 178 may oscillate the plunger 182 in and out of the solenoid assembly 183 such that the plunger 182 continuously and constantly strikes against the one or more wheels 12 for a period of time. This repeated striking motion at the one or more wheels 12 may cause the one or more wheels 12 to vibrate and shake the foreign matter off the one or more wheels 12.

Now turning to FIG. 4E, in another non-limiting embodiment, the one or more cleaning device may include the solvent applicator 148. In one or more embodiments, the solvent applicator 148 may be communicatively coupled to the communication path 36 and in communication with various components of the system. In some embodiments, the solvent applicator 148 may be configured to spray a liquid solvent onto the one or more wheels 12 in order to remove foreign matter and clean the one or more wheels 12.

In some embodiments, the solvent applicator 148 may be wholly enclosed within the housing 128. In some embodiments, the solvent applicator 148 may be partially enclosed within the housing 128. In one or more embodiments, the solvent applicator 148 may include a bottle or container 162, an electric pump mechanism 166, a suction tube 164, and a nozzle assembly. The bottle 162 may include any container that is used to hold liquids or other solvents. The bottle 162 may be made of plastic, glass, or metal. One end of the suction tube 164 is located and positioned near the bottom of the bottle 162. The other end of the suction tube 164 is coupled to the electric pump mechanism 166.

In some embodiments, the electric pump mechanism 166 may be communicatively coupled to the communication path 36. In one or more embodiments, the electric pump mechanism 166 may be configured to receive instructions from the cleaning determination module 40. In some embodiments, the cleaning determination module 40 may output a signal to control the electric pump mechanism 166. For example, the cleaning determination module 40 may determine to direct the one or more cleaning devices 44 to clean the one or more wheels 12, and in turn, activate the electric pump mechanism 166 to pump the solvent out of the bottle 162, through the suction tube 164 and the electric pump mechanism 166, out of the nozzle, and onto the one or more wheels 12 for cleaning.

Figure 6:
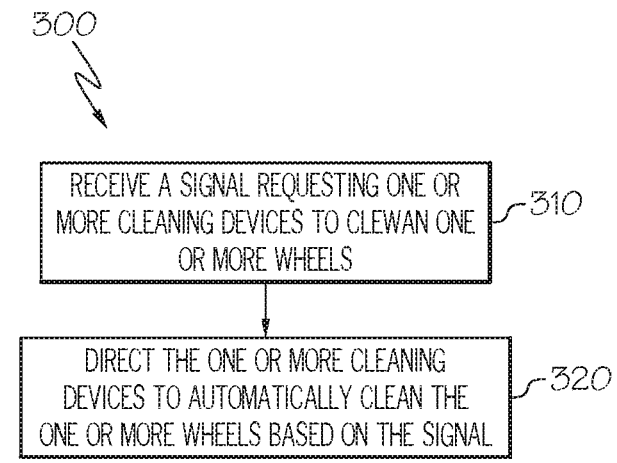
FIG. 6 depicts a flow chart of an illustrative general method of automatically cleaning a wheel according to one or more embodiments shown and described herein.

FIG. 6 depicts an example flow chat of a method 300 of automatically cleaning one or more wheels 12 using the user interface 34. At block 310, the system 10 receives a signal from the user interface 34, the signal being indicative of a request for cleaning the one or more wheels 12. In some embodiments, the signal may indicate a specific cleaning device of the one or more cleaning devices 44 and, in response output the signal to request that the cleaning determination module 40 direct the specific cleaning device to clean the one or more wheel. In some embodiments, the wheel cleaning system 16 may include two or more cleaning devices 44 such as the brushing mechanism 140, the blower mechanism 142, and the blower mechanism 142 with the heating element 144, the solvent applicator 148, the vibration mechanism 146, or any combination thereof. A user using the user interface 34 may select two or more cleaning devices 44 associated with the one or more cleaning device buttons 52. For example, a user may select the brushing mechanism 140 and the solvent applicator 148 by pressing the brushing mechanism button 54 and the solvent applicator button 61, and in return, the user interface 34 may output one or more signals indicating a request for the one or more wheels 12 to be cleaned using the brushing mechanism 140 and the solvent applicator 148.

In block 320, the system 10 determines, from the signal, to direct the one or more cleaning devices 44 to remove foreign matter from the one or more wheels 12. In some embodiments, based on the signal, the cleaning determination module 40 may be configured to select one or more of the one or more cleaning devices 44 based on a signal from the user input device. In one or more embodiments, the cleaning determination module 40 may direct a specific cleaning device associated with the signal to clean the one or more wheels 12. In some embodiments, the cleaning determination module 40 may direct two or more cleaning devices 44 to clean the one or more wheels 12 based on one or more signals received from the user interface 34.

Figure 7:
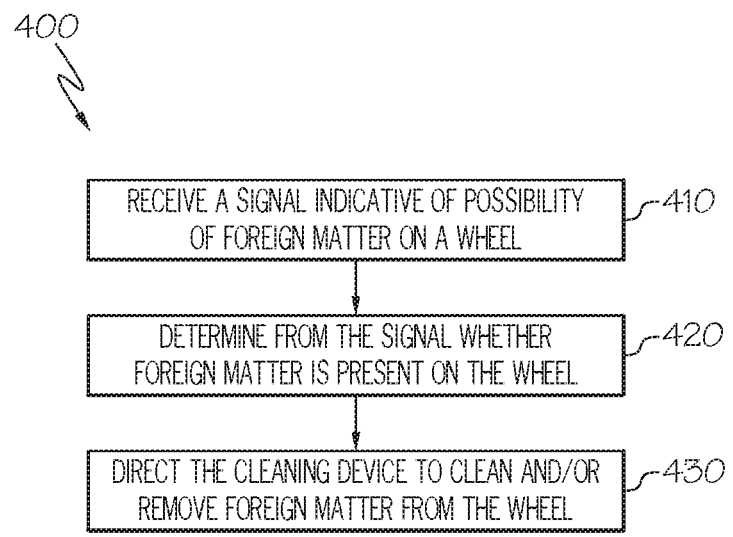
FIG. 7 depicts a flow chart of an illustrative general method of automatically detecting foreign matter and cleaning a wheel according to one or more embodiments shown and described herein.

FIG. 7 depicts a flow chart of an example method 400 of automatically cleaning a wheel. At block 410, the system 10 receives a signal from the foreign matter detector 62 22, the signal being indicative of possible foreign matter present of a surface 126 of the wheel. For example, the foreign matter detector 62 may include the foreign matter detector 62. The foreign matter detector 62 may capture one or more images of the surface 126 of the one or more wheels 12. The foreign matter detector 62 outputs the one or more images to the system 10.

In block 420, the system 10 determines, from the signal from the foreign matter detector 62 whether the foreign matter is present on the wheel. For example, referring to FIG. 2, in response to receiving an image from the foreign matter detector 62, the cleaning determination module 40 may use an image difference process to determine whether foreign matter exists on the one or more wheels 12. More specifically, the cleaning determination module 40 may receive the image from foreign matter detector 62 and compare the received image with a sample image for the one more wheels. The cleaning determination module 40 may map the colors of the received image to the colors of the stored image and determine if a difference exists between the received image and the storage image. If a difference exists, the cleaning determination module 40 may determine if the difference is greater than a predetermined threshold. If the amount of pixel difference is above a predetermined threshold amount, then the cleaning determination module 40 may determine to direct the one or more cleaning devices 44 to clean the one or more wheels 12.

Still referring to FIG. 7, at block 430, after receiving the signal, the system 10 directs the one or more cleaning devices 44 to clean and remove the foreign matter from the wheel 12 when foreign matter is present on the wheel.

Figure 8:
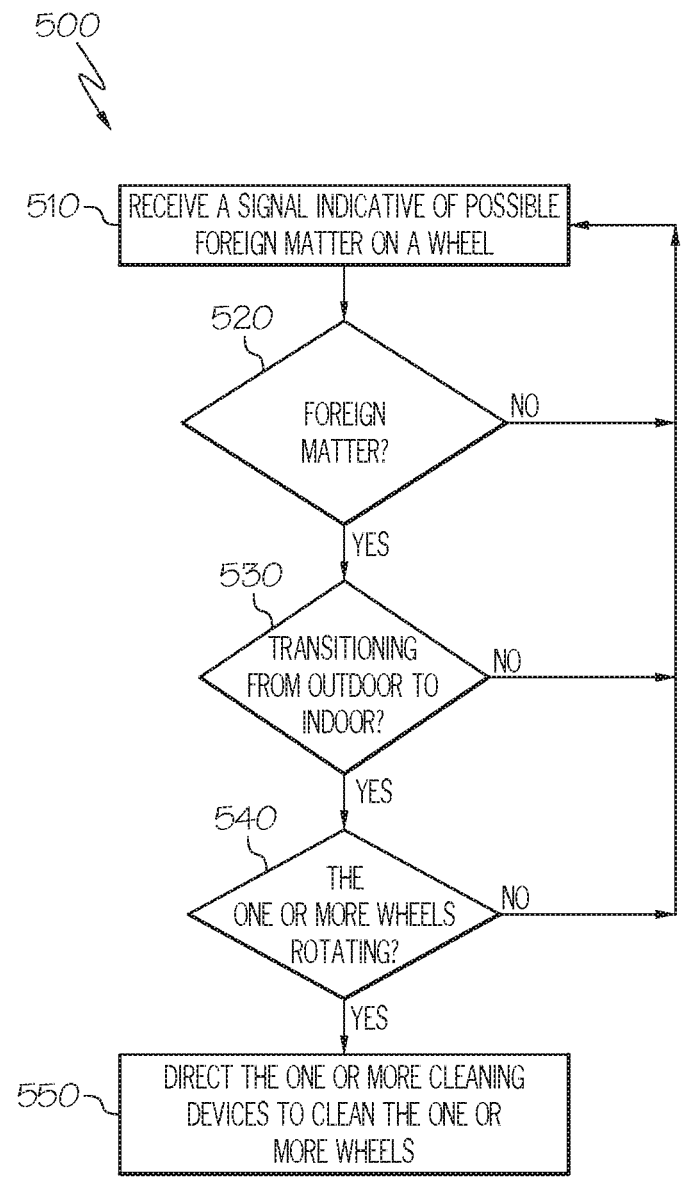
FIG. 8 depicts a flow chart of an illustrative detailed method of automatically cleaning a wheel according to one or more embodiments shown and described herein.

FIG. 8 illustrates a more detailed description of the method 400 in an example method 300 using the system 10. A user turns on the ON/OFF activation device 50 by pressing the ON button, and thereby the user interface 34 outputs an activation/ON signal to the cleaning determination module 40. Upon receiving the ON signal, the cleaning determination module 40 may start receiving signals from the system 10. Alternatively, the cleaning determination module 40 may continuously and constantly receive and output one or more signals.

In some embodiments, the foreign matter detector 62 may sense foreign matter on the surface 126 of the one or more wheels 12. In doing so, the foreign detector module photograph one more images of the surface 126 of the one or more wheels 12 and transmit the one or more images to the cleaning determination module 40.

At block 410, the cleaning determination module 40 receives the one or more images from the foreign matter detector 62, and in return, compares the one or more images to a stored image retrieved from the one or more data storage devices 74. By comparing the stored photograph image and a received photographed image, the cleaning determination module 40 may determine whether any foreign matter is present. The cleaning determination module 40 may use an image difference process to determine whether foreign matter exists on the one or more wheels 12. In doing so, the cleaning determination module 40 may map the colors of a received image to the colors of the stored image and determine if a difference exists between the received image and the storage image. In some embodiment, if a difference exists then the method 400 proceeds to block 430. Otherwise, the method 400 proceeds to block 410.

In some embodiments, if a difference exists, the cleaning determination module 40 may determine if the difference is greater than a predetermined threshold. The amount of pixel difference may be called a difference detection ratio. A detection ratio may be determined based on the pixel differences between the two images. The cleaning determination module 40 may compare the detection ratio to a predetermined threshold. The predetermined threshold may indicate an undesirable amount of foreign matter that could reduce the functionality or operations of the one or more wheels 12 or a user experience. If the difference detection ratio is greater than a predetermined threshold, the cleaning determination module 40 may direct the one or more cleaning devices 44 to clean the one or more wheels 12.

At block 430, the cleaning determination module 40 may determine whether the mobile utility machine is approaching a transition from an outdoor environment to an indoor environment. In determining whether the mobile utility machine is approaching an indoor environment, the cleaning determination module 40 may continuously receive a transition signal from the outdoor/indoor transition module 78 indicating whether the mobile utility machine is approaching a transition from outdoor an outdoor environment to an indoor environment. The outdoor/indoor transition module 78 may implement a method 500 for determining whether the mobile utility module is approaching an outdoor transition to an indoor transition will be further discussed below. Alternatively, the outdoor/indoor transition module 78 may determine whether the mobile utility machine is approaching the transition based on a signal received from an application on the mobile device 106 via the network interface hardware 98. If the mobile utility machine is approaching a transition from the outdoor environment to the indoor environment, the method 400 proceeds to block 440. Otherwise, the method 400 proceeds to block 410.

In block 440, the cleaning determination module 40 receives a signal, from the one or more wheel sensors 72, indicating whether the one or more wheels 12 are in motion or rotating. If the one or more wheels 12 are not moving, then the one or more wheels 12 cannot not effectively be cleaned since the one or more wheels 12 may need to rotate pass or through the one or more cleaning devices 44 to clean the one or more wheels 12. If the one or more wheels 12 are rotating, the cleaning determination module 40 may proceed to block 450. Otherwise, the cleaning determination module 40 may proceed to block 410.

At block 450, the cleaning determination module 40 sends the clean signal to the cleaning device 44, and thereby directs the cleaning device to clean the one or more wheels 12. In some embodiments, the cleaning device 44 may include one or more cleaning devices 44. The one or more cleaning devices 44 may include the brushing mechanism 140, the blower mechanism 142, the vibration mechanism 146, the solvent applicator 148, or a combination thereof. In response to receiving the clean signal, the cleaning device 44 begins cleaning the one or more wheels 12. In one or more embodiments, the cleaning device 44 continues to clean the one or more wheels 12 until the foreign matter detector 62 senses that the one or more wheels 12 are clean. In one or more embodiments, the cleaning determination module 40 may direct the cleaning device 44 to clean the one or more wheels 12 until the received image is equal to the storage image or within an acceptable predetermined clean range. In some embodiments, the cleaning determination module 40 may continue to send the clean signal to the cleaning device 44 until the detection ratio is less than the foreign matter threshold or the detection ratio is below a predetermined threshold.

In some embodiments, the one or more cleaning devices 44 may include the brushing mechanism 140. While cleaning is determined, the cleaning determination module 40 may direct the brushing mechanism 140 to clean the one or more wheels 12, and in return, the elevator mechanism 114 lowers the brushing mechanism 140 in the downward direction 122 to contact and clean the one or more wheels 12. Once the brushing mechanism is in position, cleaning determination module 40 may activate the one or more motors 170, and in turn, cause the one or more brushes 150 to rotate and clean the one or more wheels 12. Likewise, the cleaning determination module 40 may determine that the one or more wheels 12 are clean, and in return, the elevator mechanism 114 may retract the brushing mechanism 140 away from the one or more wheels 12 in an upward direction 124 and the one or more motors 170 may stop rotating the one or more brushes 150.

In still another embodiment, the cleaning device 44 may include the blower mechanism 142. When cleaning is determined, the cleaning determination module 40 may direct the blower mechanism 142 to clean the one or more wheels 12, and in return, the elevator mechanism 114 may lower the blower mechanism 142 in the downward direction 122 toward the one or more wheels 12. Additionally, the cleaning device 44 may activate the one or more motors 170, and thereby, cause the one or more fans 172 to blow air directly onto the one or more wheels 12 in order to remove or eliminate the foreign matter present on the one or more wheels 12.

In another embodiment, the cleaning device 44 may include the blower mechanism 142 having the heating element 144. After the elevator mechanism 114 has lowered the blower mechanism 142 as disclosed above, the cleaning determination module 40 may signal the heating element 144, and thereby, cause the heating element 144 to begin heating up. As the heating element 144 emits heat, cleaning determination module 40 causes the blower mechanism 142 to blow air pass the heating element 144 to heat the air and out of the nozzle in order to cleaning the one or more wheels 12.

In one or more embodiments, the cleaning device 44 may include the vibration mechanism. In some embodiments, the vibration mechanism includes the one or more push/pull solenoids. When cleaning is determined, the cleaning determination module 40 may direct the vibration mechanism to clean the one or more wheels 12, and in return, the elevator mechanism 114 may lower the vibration mechanism such that the vibration mechanism is adjacent and in contact with the one or more wheels 12. Additionally, the cleaning determination module 40 may activate the one or more push/pull solenoids, and thereby, cause the one or more wheels 12 to vibrate by oscillating the plunger of the push/pull solenoids to allow to plunger to continuously strike and engage the one or more wheels 12.

In some embodiments, the cleaning device 44 may include the solvent applicator 148. When cleaning is determined, the cleaning determination module 40 may direct the solvent applicator 148 to clean the one or more wheels 12, and in return, the elevator mechanism 114 may lower the solvent applicator 148 near the one or more wheels 12. Once the solvent applicator 148 has been lowered, the cleaning determination module 40 may activate the electric pump, and in turn, cause the solvent to spray out of the nozzle and clean the one or more wheels 12. Likewise, the cleaning determination module 40 may determine that the one or more wheels 12 are clean, and in return, the elevator mechanism 114 may retract the solvent applicator 148 in an upward direction 124, and in return, stop actuating the electric pump in order to stop spraying the solvent on the one or more wheels 12.

FIG. 8 illustrates an example method 500 for determining whether the mobile utility machine is approaching a transition from an outdoor environment to an indoor environment at block 430 of method 400 above. At block 510, the outdoor/indoor transition module 78 may receive a signal, from the one or more light sensors 84, indicative of a light intensity level of the mobile utility machine's current environment.

At block 520, the outdoor/indoor transition module 78 may determine whether the signal indicates a light intensity within a predetermined range, such that the mobile utility machine is approaching an indoor environment. For example, a light intensity level between 10,000 Lux to 1,000 Lux may indicate a semi-outdoor environment. A light intensity level above 10,000 Lux may indicate an outdoor environment. Additionally, a light intensity level below 1,000 Lux may indicate an indoor environment. If the outdoor/indoor transition module 78 determines that the light intensity signal is within the predetermined range, the method 500 proceeds to block 530. Otherwise, the method 500 proceeds back to block 510.

Referring to FIG. 2, in some embodiments, the outdoor/indoor transition module 78 may further determine whether the mobile utility machine is within a predetermined distance of an address location in order to determine whether the mobile utility machine is approaching a transition from an outdoor environment to an indoor environment. In doing so, the satellite antenna 90 will continuously receive and output GPS data, to the outdoor/indoor transition module 78, on the location of the mobile utility machine and a closest address near the mobile utility machine. Based on the GPS data, the outdoor/indoor module may determine a distance of the mobile utility machine from the nearest address location and determine if the mobile utility machine is within the predetermined distance of the address location.

In one or more embodiments, the outdoor/indoor transition module 78 may still further determine whether the mobile utility machine is getting closer to an object, such as a building in order to determine if the mobile utility machine is within the predetermined distance of a building. In doing so, the second proximity sensor 104 may transmit a signal, to the outdoor/indoor transition module 78, indicating that an object, such as a building has been detected. The outdoor/indoor transition module 78 may determine that the mobile transition module is getting closer to the object and is within a predetermined range.

At block 550 of FIG. 8, the outdoor/indoor transition module 78 transmits a signal, to the cleaning determination module 40, indicating that the mobile utility machine is approaching a transition from an outdoor environment to an indoor environment.

Figure 9:
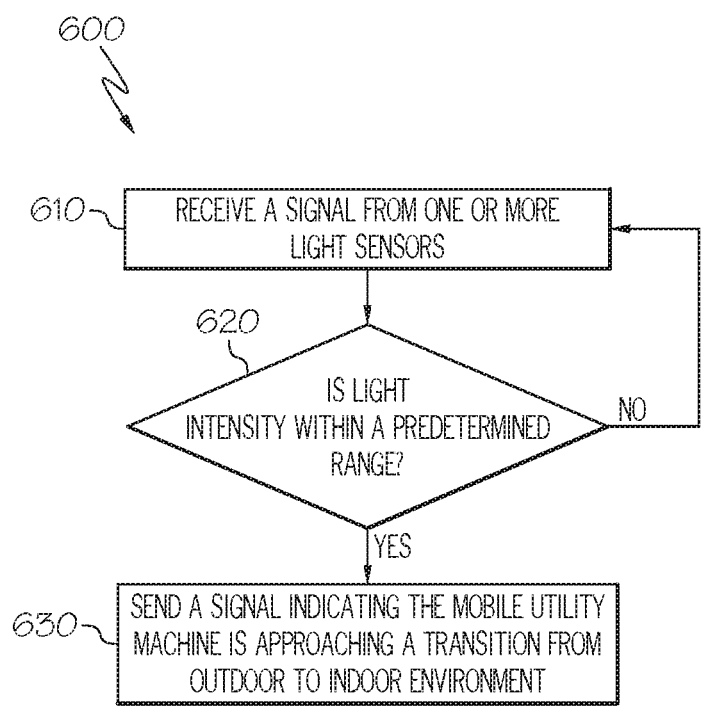
FIG. 9 depicts a flow chart of an illustrative general method of determining when a mobile utility machine is approaching a transition from an outdoor to an indoor environment according to one or more embodiments shown and described herein.

FIG. 9 is a flow diagram of an illustrative method completed by the system 10 (FIGS. 1A-1B) and/or the components thereof for determining whether the system 10 is approaching a threshold in embodiments where such threshold detection is utilized. That is, the steps described with respect to FIG. 9 may be utilized when cleaning of the wheels 12 occurs automatically upon detection of a threshold that is being approached. It should be understood that the steps in FIG. 9 may be omitted in embodiments where cleaning is actuated by a user or actuated in other instances, as described herein.

Referring to FIGS. 2 and 9, a signal may be received from the one or more light sensors 84 at block 620. In some embodiments, the signal may correspond to a particular light intensity, as described herein. A determination may be made as to whether the light intensity is within a predetermined range at block 620. That is, a determination is made as to whether the light intensity corresponds to an indoor light intensity, as described herein. If the light intensity is not within the predetermined range, the process may return to block 610. If the light intensity is within the predetermined range, the process may proceed to block 630. At block 630, a signal is sent indicating that the mobile utility machine is approaching a transition from the outdoor environment to the indoor environment. The signal can be usable to actuate the various cleaning components as described herein.

It should be understood that while the embodiment of FIG. 9 is particular to light intensity, the present disclosure is not limited to such. For example, in embodiments where the one or more light sensors 84 are imaging devices, the signals received may be signals containing image data, which is processed by applying an image recognition algorithm or the like to recognize particular objects in the image data. If objects that indicate a transition (e.g., a door, a door frame, or the like) is present in the image data, a signal may be sent that indicates the mobile utility machine is approaching a transition.

It should now be understood that embodiments described herein are directed to systems and methods for automatically cleaning one or more wheels include machine readable storage having instructions to receive a signal from the foreign matter detector, the signal being indicative of possible foreign matter present on a surface of the wheel, determine, from the signal, whether foreign matter is present on the wheel, and direct the cleaning device to remove the foreign matter from the wheel when foreign matter is present on the wheel. Another aspect of the systems and methods disclosed herein include the cleaning device comprising of at least one of: a brushing mechanism, a vibration mechanism, a heater device, a solvent applicator, a blowing device, and any combination thereof. Still another aspect of the systems and methods disclosed herein include the one or more wheels being part of a wheelchair or a mobile robot. The systems and methods disclosed herein also include further program instructions such as to receive a transition signal indicative of the wheel approaching a transition from an outdoor environment to an indoor environment, and direct the cleaning device to clean the one or more wheels in response to the transition signal.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A system, comprising:
   a foreign matter detector coupled to a structure having a wheel;
   a cleaning device coupled to the structure adjacent to the wheel without contacting the wheel;
   a module communicatively coupled to the foreign matter detector and the cleaning device and configured to:
   receive a signal from the foreign matter detector indicative of possible foreign matter present on the wheel;
   determine, from the signal, that foreign matter is present on the wheel; and
   direct the cleaning device to remove the foreign matter from the wheel without contacting the wheel.

2. The system of claim 1, wherein the signal indicates an amount of foreign matter on the wheel and determining that foreign matter is present on the wheel comprises:
   determining whether the amount of the foreign matter is greater than a threshold; and
   directing the cleaning device to clean the wheel in response to the amount of the foreign matter exceeding the threshold.

3. The system of claim 1, wherein the cleaning device comprises a vibration mechanism, a heater element, a solvent applicator, and/or a blower.

4. The system of claim 1, wherein the structure is a wheelchair.

5. The system of claim 1, wherein the structure is a mobile robot system.

6. The system of claim 1, further comprising: a transition detector communicatively coupled to the module, wherein the module is further configured to:
   receive a transition signal indicative of the wheel approaching a transition from an outdoor environment to an indoor environment; and
   direct the cleaning device to clean the wheel in response to the transition signal.

7. The system of claim 1, wherein the module is further configured to direct the cleaning device to clean the wheel until a sensed amount of the foreign matter is below a threshold.

8. A method of cleaning a wheel, the method comprising:
   receiving a signal, by a module from a foreign matter detector coupled to a structure having the wheel, the signal indicative of possible foreign matter present on the wheel;
   determining from the signal that foreign matter is present on the wheel; and
   directing a cleaning device coupled to the structure and adjacent to the wheel without contacting the wheel to remove the foreign matter from the wheel without contacting the wheel wherein the module is communicatively coupled to the foreign matter detector and the cleaning device.

9. The method of claim 8, wherein the signal indicates an amount of foreign matter on the wheel and determining that foreign matter is present on the wheel comprises:
   determining whether the amount of the foreign matter is greater than a threshold; and
   directing the cleaning device to clean the wheel in response to an amount of the foreign matter exceeding the threshold.

10. The method of claim 8, further comprising:
    receiving a transition signal indicative of the wheel approaching a transition from an outdoor environment to an indoor environment; and
    directing the cleaning device to clean the wheel in response to the transition signal.

11. The method of claim 8, further comprising:
    directing the cleaning device to clean the wheel until a sensed amount of the foreign matter is below a threshold.

12. The method of claim 8, further comprising:
receiving a user input signal requesting to clean the wheel; and
directing the cleaning device to clean the wheel in response to the user input signal being received.

13. A system for automatically cleaning one or more wheels, comprising:
a mobile utility machine having one or more wheels;
at least one foreign matter detector coupled to the mobile utility machine and positioned adjacent to the one or more wheels;
at least one cleaning device coupled to the mobile utility machine and arranged adjacent to at least one of the one or more wheels without contacting the at least one of the one or more wheels; and
a cleaning determination module communicatively coupled to the at least one foreign matter detector and the at least one cleaning device and configured to:
receive a signal from the at least one foreign matter detector indicative of possible foreign matter present on at least one of the one or more wheels,
determine from the signal that the foreign matter is present on at least one of the one or more wheels, and
direct the at least one cleaning device to remove the foreign matter from the at least one of the one or more wheels without contacting the at least one of the one or more wheels.

14. The system of claim 13, wherein the signal indicates an amount of foreign matter on the at least one of the one or more wheels and determining that foreign matter is present on the at least one of the one or more wheels comprises:
determining whether the amount of the foreign matter is greater than a threshold; and
directing the at least one cleaning device to clean the one or more wheels in response to an amount of the foreign matter exceeding the threshold.

15. The system of claim 13, wherein the at least one cleaning device comprises a vibration mechanism, a heater device, a solvent spraying device, and/or a blowing device.

16. The system of claim 13, wherein the mobile utility machine is a mobile robot.

17. The system of claim 13, wherein the mobile utility machine is a wheelchair.

18. The system of claim 13, wherein the cleaning determination module is further configured to receive an image indicative of the foreign matter present on the at least one of the one or more wheels, determine an amount of the foreign matter on the at least one of the one or more wheels based on the image, determine whether the amount of the foreign matter is greater than a threshold, and direct the at least one cleaning device to clean the at least one of the one or more wheels when the amount of the foreign matter exceeds the threshold.

19. The system of claim 13, further comprising: a user input device communicatively coupled to the cleaning determination module, wherein the cleaning determination module is further configured to receive a clean signal, from the user input device, and direct the at least one cleaning device to clean the at least one of the one or more wheels in response to receiving the clean signal.

20. The system of claim 13, further comprising: a transition device communicatively coupled to the cleaning determination module, wherein the cleaning determination module is further configured to receive a transition signal, from the transition device, indicating that the mobile utility machine is approaching a transition from an outdoor environment to an indoor environment, and direct the at least one cleaning device to clean the at least one of the one or more wheels, in response to receiving the transition signal.

* * * * *